(12) United States Patent
Akutsu et al.

(10) Patent No.: US 11,614,569 B2
(45) Date of Patent: Mar. 28, 2023

(54) DETECTION DEVICE

(71) Applicant: Japan Display Inc., Tokyo (JP)

(72) Inventors: Kenichi Akutsu, Tokyo (JP); Atsuko Imoto, Tokyo (JP); Yoshio Maruoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/528,599

(22) Filed: Nov. 17, 2021

(65) Prior Publication Data
US 2022/0163701 A1    May 26, 2022

(30) Foreign Application Priority Data
Nov. 26, 2020   (JP) .............................. JP2020-196021

(51) Int. Cl.
| | |
|---|---|
| *G02B 3/00* | (2006.01) |
| *G06F 3/041* | (2006.01) |
| *G06F 3/042* | (2006.01) |
| *G02B 5/00* | (2006.01) |
| *G02B 5/20* | (2006.01) |

(52) U.S. Cl.
CPC .......... *G02B 3/0056* (2013.01); *G02B 5/003* (2013.01); *G02B 5/208* (2013.01); *G06F 3/042* (2013.01); *G06F 3/0416* (2013.01); *G06F 2203/04103* (2013.01)

(58) Field of Classification Search
CPC ...... G02B 3/0056; G02B 5/003; G02B 5/208; G06F 3/0416; G06F 3/042; G06F 2203/04103
See application file for complete search history.

(56) References Cited

U.S. PATENT DOCUMENTS

| | | | |
|---|---|---|---|
| 2006/0170658 A1* | 8/2006 | Nakamura | ............ G06F 3/0412 345/173 |
| 2012/0307123 A1* | 12/2012 | Cok | .................. H01L 27/14603 348/333.01 |
| 2016/0245961 A1* | 8/2016 | Akasaka | ................ G02B 27/01 |
| 2019/0080138 A1 | 3/2019 | Gao et al. | |

* cited by examiner

*Primary Examiner* — Mihir K Rayan
(74) *Attorney, Agent, or Firm* — K&L Gates LLP

(57) ABSTRACT

According to an aspect, a detection device includes: a substrate that has a detection region; a plurality of photodiodes provided in the detection region; a plurality of lenses provided so as to overlap the respective photodiodes; and a plurality of dummy lenses that are provided in a peripheral region between an outer perimeter of the detection region and edges of the substrate and are provided so as not to overlap the photodiodes.

18 Claims, 14 Drawing Sheets

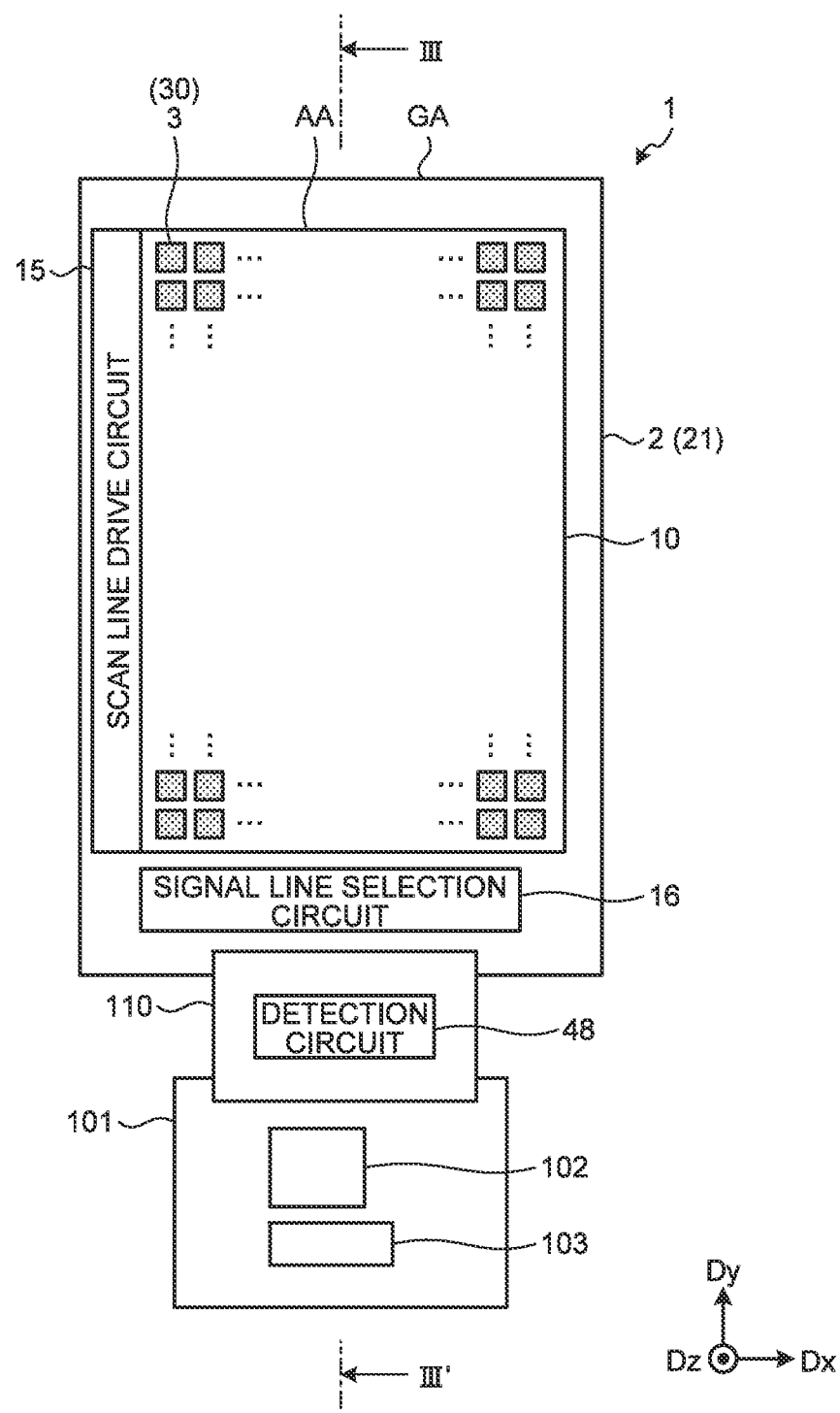

DETECTION DEVICE

CROSS-REFERENCE TO RELATED APPLICATION

This application claims the benefit of priority from Japanese Patent Application No. 2020-196021 filed on Nov. 26, 2020, the entire contents of which are incorporated herein by reference.

BACKGROUND

1. Technical Field

What is disclosed herein relates to a detection device.

2. Description of the Related Art

United States Patent Application Publication No. 2019/0080138 describes a display panel that includes a lens array in which a plurality of lenses are arranged, a photosensor array in which a plurality of photosensors are arranged, and a pinhole array provided between the lens array and the photosensor array.

In a detection device in which the pinhole array and the lens array are stacked above the photosensor array, shapes of the lenses may be nonuniformly formed due to variations in process conditions (such as heat, light, and chemical solutions) in a manufacturing process. When the shapes of the lenses vary, the state of light condensed on the sensors through the lenses varies. As a result, variations in the shapes of the lenses may reduce detection accuracy.

SUMMARY

According to an aspect, a detection device includes: a substrate that has a detection region; a plurality of photodiodes provided in the detection region; a plurality of lenses provided so as to overlap the respective photodiodes; and a plurality of dummy lenses that are provided in a peripheral region between an outer perimeter of the detection region and edges of the substrate and are provided so as not to overlap the photodiodes.

BRIEF DESCRIPTION OF THE DRAWINGS

FIG. 2 is a plan view illustrating the detection device according to the embodiment;

DETAILED DESCRIPTION

Figure 1A:
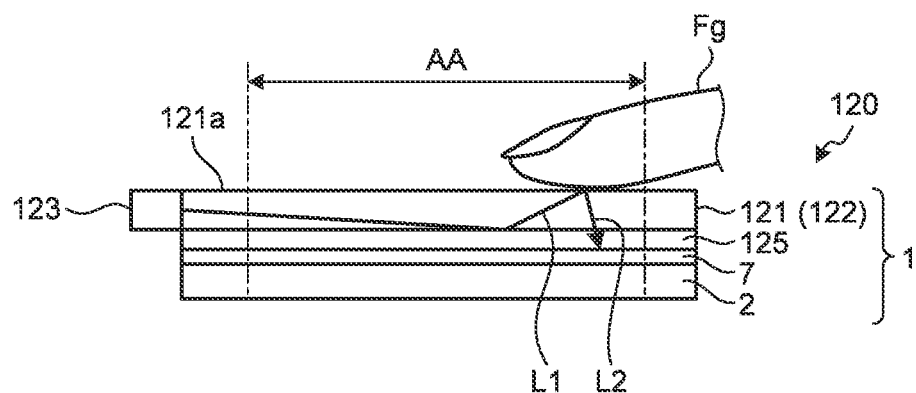
FIG. 1A is a sectional view illustrating a schematic sectional configuration of a detection apparatus having an illumination device, the detection apparatus including a detection device according to an embodiment.

The following describes a mode (embodiment) for carrying out the present invention in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, widths, thicknesses, shapes, and the like of various parts may be schematically illustrated in the drawings as compared with actual aspects thereof. However, they are merely examples, and interpretation of the present disclosure is not limited thereto. The same component as that described with reference to an already mentioned drawing is denoted by the same reference numeral through the disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

Figure 1B:
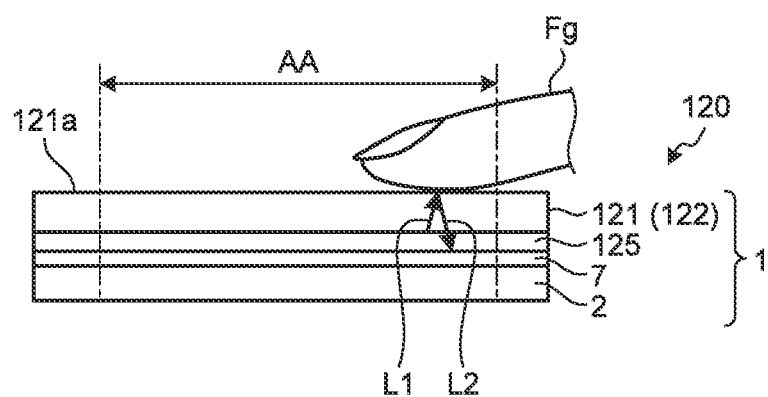
FIG. 1B is a sectional view illustrating a schematic sectional configuration of the detection apparatus having an illumination device, the detection apparatus including the detection device according to a first modification of the embodiment.
Figure 1C:
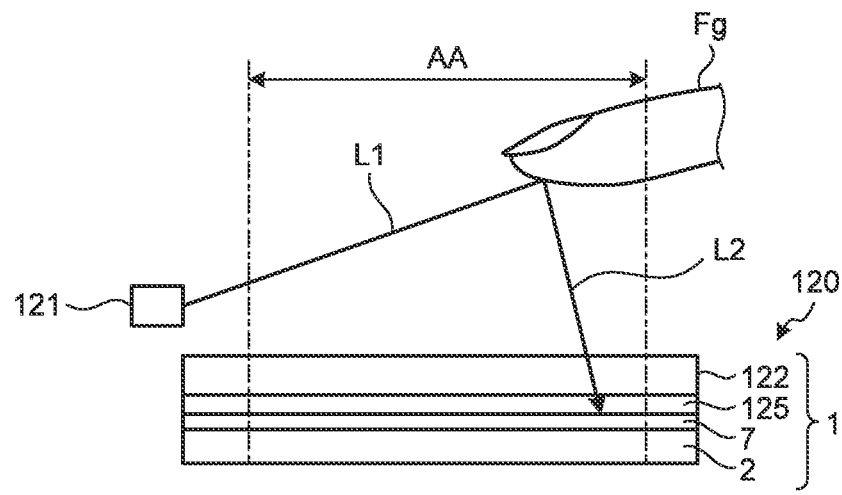
FIG. 1C is a sectional view illustrating a schematic sectional configuration of the detection apparatus having an illumination device, the detection apparatus including the detection device according to a second modification of the embodiment.
Figure 1D:
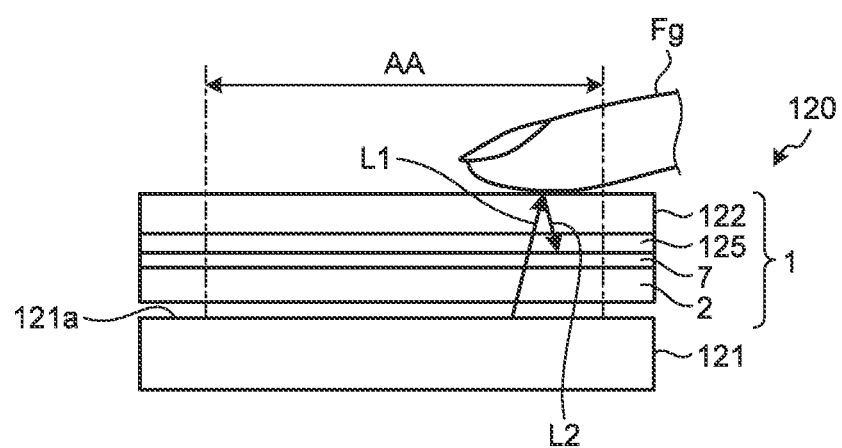
FIG. 1D is a sectional view illustrating a schematic sectional configuration of the detection apparatus having an illumination device, the detection apparatus including the detection device according to a third modification of the embodiment.

FIG. 1A is a sectional view illustrating a schematic sectional configuration of a detection apparatus having an illumination device, the detection apparatus including a detection device according to an embodiment. FIG. 1B is a sectional view illustrating a schematic sectional configuration of the detection apparatus having an illumination device, the detection apparatus including the detection device according to a first modification of the embodiment. FIG. 1C is a sectional view illustrating a schematic sectional configuration of the detection apparatus having an illumination device, the detection apparatus including the detection device according to a second modification of the embodiment. FIG. 1D is a sectional view illustrating a schematic sectional configuration of the detection apparatus having an illumination device, the detection apparatus including the detection device according to a third modification of the embodiment.

As illustrated in FIG. 1A, a detection apparatus 120 having an illumination device includes a detection device 1 and an illumination device 121. The detection device 1 includes an array substrate 2, an optical filter 7, an adhesive layer 125, and a cover member 122. That is, the array substrate 2, the optical filter 7, the adhesive layer 125, and the cover member 122 are stacked in the order as listed, in a direction orthogonal to a surface of the array substrate 2. The cover member 122 of the detection device 1 can be replaced with the illumination device 121, as will be described later. The adhesive layer 125 only needs to bond the optical filter 7 to the cover member 122. Hence, the detection device 1 may have a structure without the adhesive layer 125 in a region corresponding to a detection region AA. When the adhesive layer 125 is not provided in the detection region AA, the detection device 1 has a structure in which the adhesive layer 125 bonds the cover member 122 to the optical filter 7 in a region corresponding to a peripheral region GA outside the detection region AA. The adhesive layer 125 provided in the detection region AA may be simply paraphrased as a protective layer for the optical filter 7.

As illustrated in FIG. 1A, the illumination device 121 may be, for example, what is called a side light-type front light that uses the cover member 122 as a light guide plate provided at a location corresponding to a detection region AA of the detection device 1, and that includes a plurality of light sources 123 arranged side by side at one end or both ends of the cover member 122. That is, the cover member 122 has a light-emitting surface 121a for emitting light, and serves as one component of the illumination device 121. The illumination device 121 emits light L1 from the light-emitting surface 121a of the cover member 122 toward a finger Fg serving as a detection target. For example, light-emitting diodes (LEDs) for emitting light in a predetermined color are used as the light sources.

As illustrated in FIG. 1B, the illumination device 121 may include light sources (such as LEDs) provided immediately below the detection region AA of the detection device 1, and the illumination device 121 including the light sources serves also as the cover member 122.

The illumination device 121 is not limited to the example of FIG. 1B. As illustrated in FIG. 1C, the illumination device 121 may be provided on a lateral side of or above the cover member 122, and may emit the light L1 to the finger Fg from the lateral side of or above the finger Fg.

Furthermore, as illustrated in FIG. 1D, the illumination device 121 may be what is called a direct-type backlight that includes light sources (such as LEDs) provided in the detection region of the detection device 1.

The light L1 emitted from the illumination device 121 is reflected as light L2 by the finger Fg serving as the detection target. The detection device 1 detects the light L2 reflected by the finger Fg to detect asperities (such as a fingerprint) on the surface of the finger Fg. The detection device 1 may further detect the light L2 reflected inside the finger Fg to detect information on a living body in addition to detecting the fingerprint. Examples of the information on the living body include a blood vessel image of, for example, a vein, pulsation, and a pulse wave. The color of the light L1 from the illumination device 121 may be varied depending on the detection target.

The cover member 122 is a member for protecting the array substrate 2 and the optical filter 7, and covers the array substrate 2 and the optical filter 7. The illumination device 121 may have a structure to double as the cover member 122 as described above. In the structures illustrated in FIGS. 1C and 1D in which the cover member 122 is separate from the illumination device 121, the cover member 122 is, for example, a glass substrate. The cover member 122 is not limited to the glass substrate, and may be, for example, a resin substrate. The cover member 122 need not be provided. In this case, the surface of the array substrate 2 and the optical filter 7 is provided with a protective layer of, for example, an insulating film, and the finger Fg contacts the protective layer of the detection device 1.

As illustrated in FIG. 1B, the detection apparatus 120 having an illumination device may be provided with a display panel instead of the illumination device 121. The display panel may be, for example, an organic electroluminescent (EL) diode (organic light-emitting diode (OLED)) display panel or an inorganic EL display (micro-LED or mini-LED). Alternatively, the display panel may be a liquid crystal display (LCD) panel using liquid crystal elements as display elements or an electrophoretic display (EPD) panel using electrophoretic elements as the display elements. Even in this case, the fingerprint of the finger Fg and the information on the living body can be detected based on the light L2 obtained by reflection of display light (light L1), which has been emitted from the display panel, by the finger Fg.

FIG. 2 is a plan view illustrating the detection device according to the embodiment. A first direction Dx illustrated in FIG. 2 and the subsequent drawings is one direction in a plane parallel to a substrate 21. A second direction Dy is a direction in the plane parallel to the substrate 21, and is a direction orthogonal to the first direction Dx. The second direction Dy may intersect the first direction Dx without being orthogonal thereto. A third direction Dz is a direction orthogonal to the first direction Dx and the second direction Dy, and is a direction normal to the substrate 21. The term "plan view" refers to a positional relation as viewed from the third direction Dz.

As illustrated in FIG. 2, the detection device 1 includes an array substrate 2 (substrate 21), a sensor 10, a scan line drive circuit 15, a signal line selection circuit 16, a detection circuit 48, a control circuit 102, and a power supply circuit 103.

The substrate 21 is electrically coupled to a control substrate 101 through a wiring substrate 110. The wiring substrate 110 is, for example, a flexible printed circuit board or a rigid circuit board. The wiring substrate 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor 10, the scan line drive circuit 15, and the signal line selection circuit 16 to control operations of the sensor 10. The power supply circuit 103 supplies voltage signals including, for example, a power supply potential VDD and a reference potential VCOM (refer to FIG. 4) to the sensor 10, the scan line drive circuit 15, and the signal line selection circuit 16. Although the present embodiment exemplifies the case of disposing the detection circuit 48 on the wiring substrate 110, the present disclosure is not limited to this case. The detection circuit 48 may be disposed on the substrate 21.

The substrate 21 has the detection region AA and the peripheral region GA. The detection region AA and the peripheral region GA extend in planar directions parallel to the substrate 21. Elements (detection elements 3) of the sensor 10 are provided in the detection region AA. The peripheral region GA is a region outside the detection region AA, and is a region not provided with the elements (detection elements 3). That is, the peripheral region GA is a region between the outer perimeter of the detection region AA and edges of the substrate 21. The scan line drive circuit 15 and the signal line selection circuit 16 are provided in the peripheral region GA. The scan line drive circuit 15 is provided in a region extending along the second direction Dy in the peripheral region GA. The signal line selection circuit 16 is provided in a region extending along the first direction Dx in the peripheral region GA, and is provided between the sensor 10 and the detection circuit 48.

Each of the detection elements 3 of the sensor 10 is a photosensor including a photodiode 30 as a sensor element. The photodiode 30 is a photoelectric conversion element, and outputs an electrical signal corresponding to light irradiating each of the photodiodes 30. More specifically, the photodiode 30 is a positive-intrinsic-negative (PIN) photodiode. The photodiode 30 may be paraphrased as an organic photodiode (OPD). The detection elements 3 are arranged in a matrix having a row-column configuration in the detection region AA. The photodiode 30 included in each of the detection elements 3 performs the detection in accordance with a gate drive signal (for example, a reset control signal RST or a read control signal RD) supplied from the scan line drive circuit 15. Each of the photodiodes 30 outputs the electrical signal corresponding to the light irradiating the photodiode 30 as a detection signal Vdet to the signal line selection circuit 16. The detection device 1 detects the information on the living body based on the detection signals Vdet received from the photodiodes 30.

Figure 3:
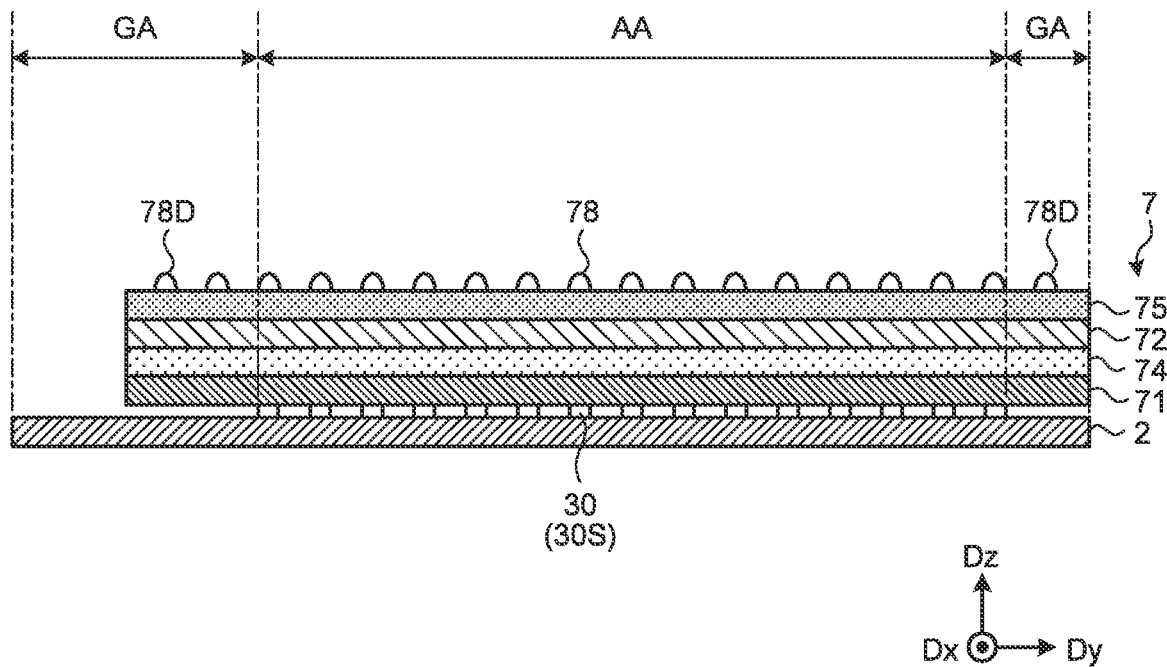
FIG. 3 is a III-III' sectional view of FIG. 2.

FIG. 3 is a III-III' sectional view of FIG. 2. FIG. 3 schematically illustrates a layered configuration of the array substrate 2, the photodiodes 30, and the optical filter 7.

The optical filter 7 is provided on the photodiodes 30 (partial photodiodes 30S). The optical filter 7 is an optical element that receives the light L2 reflected by an object to be detected such as the finger Fg, transmits, toward the photodiodes 30, components of the light L2 traveling in the third direction Dz, and blocks components of the light L2 traveling in oblique directions. The optical filter 7 is also called collimated apertures or a collimator.

The optical filter 7 is provided over the detection region AA and the peripheral region GA. The optical filter 7 includes, on an upper surface thereof, a plurality of lenses 78 and a plurality of dummy lenses 78D. The lenses 78 are provided in the detection region AA and are provided so as to overlap the respective photodiodes 30 (partial photodiodes 30S). The light L2 reflected by the object to be detected such as the finger Fg is condensed by the lenses 78 and is emitted to the photodiodes 30 (partial photodiodes 30S) corresponding to the lenses 78.

The dummy lenses 78D are provided in the peripheral region GA and are provided so as not to overlap the photodiodes 30 (partial photodiodes 30S) in the detection region AA. The dummy lenses 78D are formed to have the same configuration as that of the lenses 78. However, light that has passed through the dummy lenses 78D is blocked by a light-blocking layer (a first light-blocking layer 71 or a second light-blocking layer 72) of the optical filter 7, and thus, is not incident on the photodiodes 30 in the detection region AA. That is, the dummy lenses 78D do not serve as optical elements for the photodiodes 30 in the detection region AA.

In FIG. 3, the dummy lenses 78D are provided in the peripheral region GA adjacent to the detection region AA in the second direction Dy. However, the dummy lenses 78D are also provided in the peripheral region GA (not illustrated in FIG. 3) adjacent to the detection region AA in the first direction Dx. That is, the dummy lenses 78D are preferably arranged in a frame shape surrounding the detection region AA.

A detailed configuration of the optical filter 7 including the array substrate 2, the photodiodes 30, the lenses 78, and the dummy lenses 78D will be described later.

Figure 4:
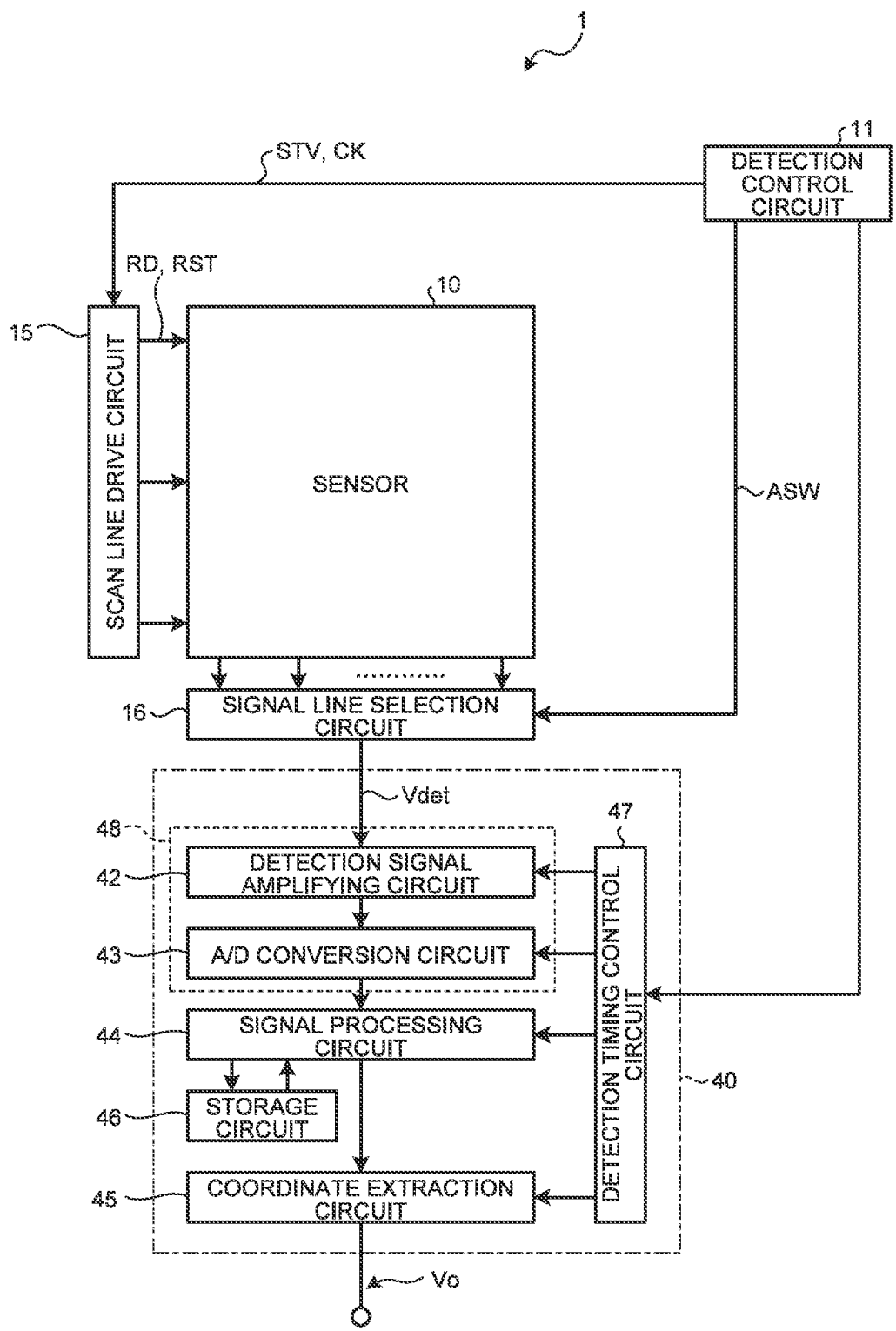
FIG. 4 is a block diagram illustrating a configuration example of the detection device according to the embodiment.

FIG. 4 is a block diagram illustrating a configuration example of the detection device according to the embodiment. As illustrated in FIG. 4, the detection device 1 further includes a detection control circuit 11 and a detector 40. One, some, or all functions of the detection control circuit 11 are included in the control circuit 102. One, some, or all functions of the detector 40 other than those of the detection circuit 48 are also included in the control circuit 102.

The detection control circuit 11 is a circuit that supplies control signals to the scan line drive circuit 15, the signal line selection circuit 16, and the detector 40 to control operations of these components. The detection control circuit 11 supplies various control signals including, for example, a start signal STV and a clock signal CK to the scan line drive circuit 15. The detection control circuit 11 also supplies various control signals including, for example, a selection signal ASW to the signal line selection circuit 16.

The scan line drive circuit 15 is a circuit that drives a plurality of scan lines (read control scan line GLrd and reset control scan lines GLrst (refer to FIG. 5)) based on the various control signals. The scan line drive circuit 15 sequentially or simultaneously selects the scan lines and supplies the gate drive signal (for example, the reset control signal RST or the read control signal RD) to the selected scan lines. Through this operation, the scan line drive circuit 15 selects the photodiodes 30 coupled to the scan lines.

Figure 5:
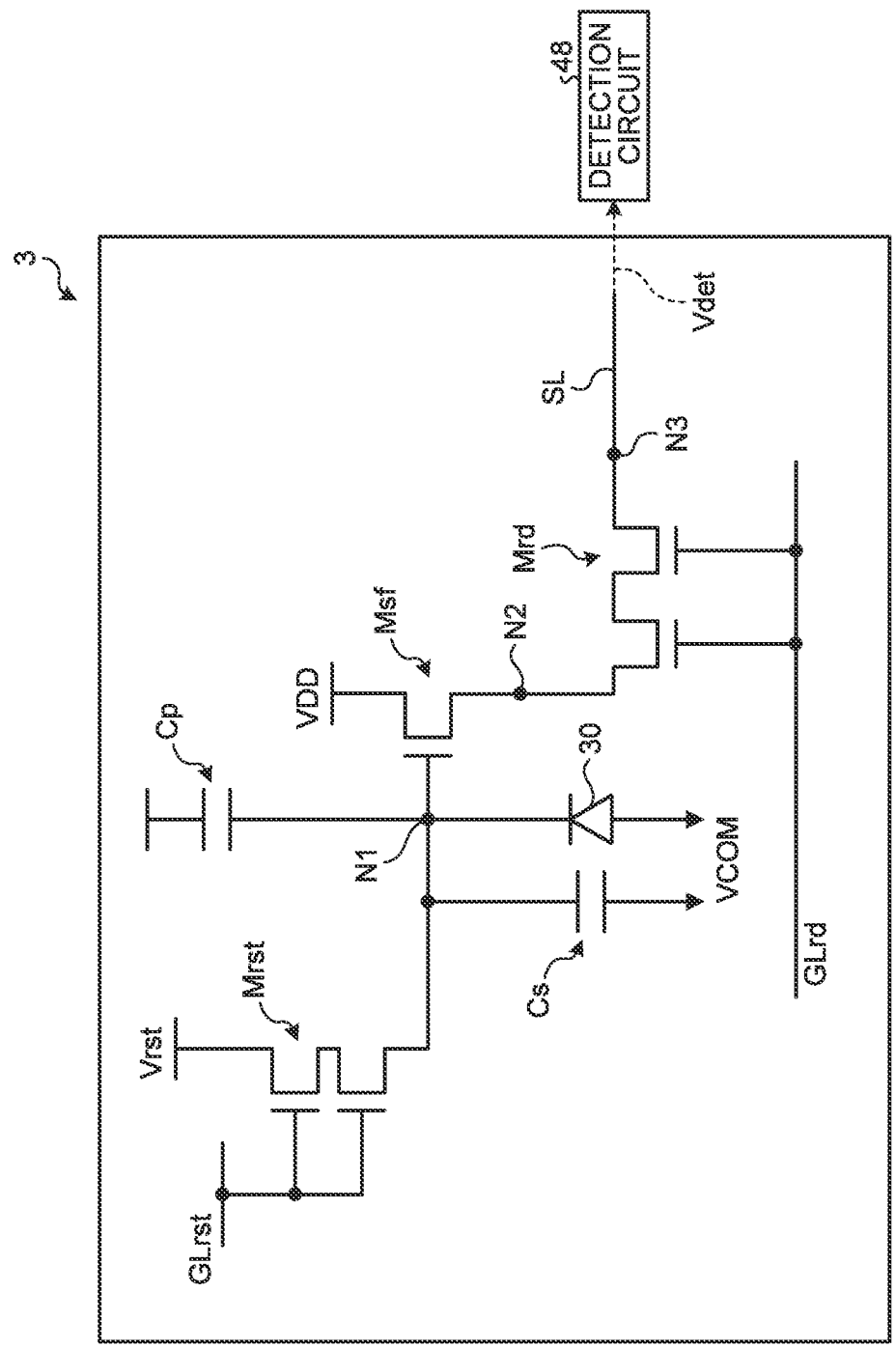
FIG. 5 is a circuit diagram illustrating a detection element.

The signal line selection circuit 16 is a switching circuit that sequentially or simultaneously selects output signal lines SL (refer to FIG. 5). The signal line selection circuit 16 is, for example, a multiplexer. The signal line selection circuit 16 couples the selected output signal lines SL to the detection circuit 48 based on the selection signal ASW supplied from the detection control circuit 11. Through this operation, the signal line selection circuit 16 outputs the detection signal Vdet of the photodiode 30 to the detector 40.

The detector 40 includes the detection circuit 48, a signal processing circuit 44, a coordinate extraction circuit 45, a storage circuit 46, and a detection timing control circuit 47. The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front end (AFE) circuit. The detection circuit 48 is a signal processing circuit having functions of at least a detection signal amplifying circuit 42 and an analog-to-digital (A/D) conversion circuit 43. The detection signal amplifying circuit 42 is a circuit that amplifies the detection signal Vdet, and is, for example, an integration circuit. The A/D conversion circuit 43 converts an analog signal output from the detection signal amplifying circuit 42 into a digital signal.

The signal processing circuit 44 is a logic circuit that detects a predetermined physical quantity received by the sensor 10 based on output signals of the detection circuit 48. The signal processing circuit 44 can detect asperities on a surface of the finger Fg or a palm based on the signals from the detection circuit 48 when the finger Fg is in contact with or in proximity to a detection surface. The signal processing circuit 44 may detect the information on the living body based on the signals from the detection circuit 48. Examples of the information on the living body include a blood vessel image, a pulse wave, pulsation, and blood oxygen saturation of the finger Fg or the palm.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the surface of the finger Fg or the like when the contact or proximity of the finger Fg is detected by the signal processing circuit 44. The coordinate extraction circuit 45 is the logic circuit that also obtains detected coordinates of blood vessels of the finger Fg or the palm. The coordinate extraction circuit 45 combines the detection signals Vdet output from the respective detection elements 3 of the sensor 10 to generate two-dimensional information representing a shape of the asperities on the surface of the finger Fg or the like. The coordinate extraction circuit 45 may output the detection signals Vdet as sensor outputs Vo instead of calculating the detected coordinates.

The following describes a circuit configuration example of the detection device 1. FIG. 5 is a circuit diagram illustrating the detection element. As illustrated in FIG. 5, the detection element 3 includes the photodiode 30, a reset transistor Mrst, a read transistor Mrd, and a source follower transistor Msf. The reset transistor Mrst, the read transistor Mrd, and the source follower transistor Msf are provided correspondingly to each of the photodiodes 30. Each of the reset transistor Mrst, the read transistor Mrd, and the source follower transistor Msf is made up of an n-type thin-film transistor (TFT). However, each of the transistors is not limited thereto, and may be made up of a p-type TFT.

The reference potential VCOM is applied to an anode of the photodiode 30. A cathode of the photodiode 30 is coupled to a node N1. The node N1 is coupled to a capacitive element Cs, one of the source and the drain of the reset transistor Mrst, and the gate of the source follower transistor Msf. The node N1 further has parasitic capacitance Cp. When light enters the photodiode 30, a signal (electrical charge) output from the photodiode 30 is stored in the capacitive element Cs. The capacitive element Cs is, for example, capacitance formed between an upper conductive layer 34 and a lower conductive layer 35 (refer to FIG. 12) that are coupled to the photodiode 30. The parasitic capacitance Cp is capacitance added to the capacitive element Cs and is also capacitance generated between various types of wiring and electrodes provided on the array substrate 2.

The gates of the reset transistor Mrst are coupled to the reset control scan line GLrst. The other one of the source and the drain of the reset transistor Mrst is supplied with a reset potential Vrst. When the reset transistor Mrst is turned on (into a conduction state) in response to the reset control signal RST, the potential of the node N1 is reset to the reset potential Vrst. The reference potential VCOM is lower than the reset potential Vrst, and the photodiode 30 is driven in a reverse bias state.

The source follower transistor Msf is coupled between a terminal supplied with the power supply potential VDD and the read transistor Mrd (node N2). The gate of the source follower transistor Msf is coupled to the node N1. The gate of the source follower transistor Msf is supplied with the signal (electrical charge) generated by the photodiode 30. This operation causes the source follower transistor Msf to output a voltage signal corresponding to the signal (electrical charge) generated by the photodiode 30 to the read transistor Mrd.

The read transistor Mrd is coupled between the source of the source follower transistor Msf (node N2) and the output signal line SL (node N3). The gates of the read transistor Mrd are coupled to the read control scan line GLrd. When the read transistor Mrd is turned on in response to the read control signal RD, the signal output from the source follower transistor Msf, that is, the voltage signal corresponding to the signal (electrical charge) generated by the photodiode 30 is output as the detection signal Vdet to the output signal line SL.

In the example illustrated in FIG. 5, the reset transistor Mrst and the read transistor Mrd each have what is called a double-gate structure configured by coupling two transistors in series. However, the structures of those transistors are not limited thereto; the reset transistor Mrst and the read transistor Mrd may have a single-gate structure, or a multi-gate structure including three or more transistors coupled in series. The circuit of the detection element 3 is not limited to the configuration including the three transistors of the reset transistor Mrst, the source follower transistor Msf, and the read transistor Mrd. The detection element 3 may include two transistors, or four or more transistors.

Figure 6:
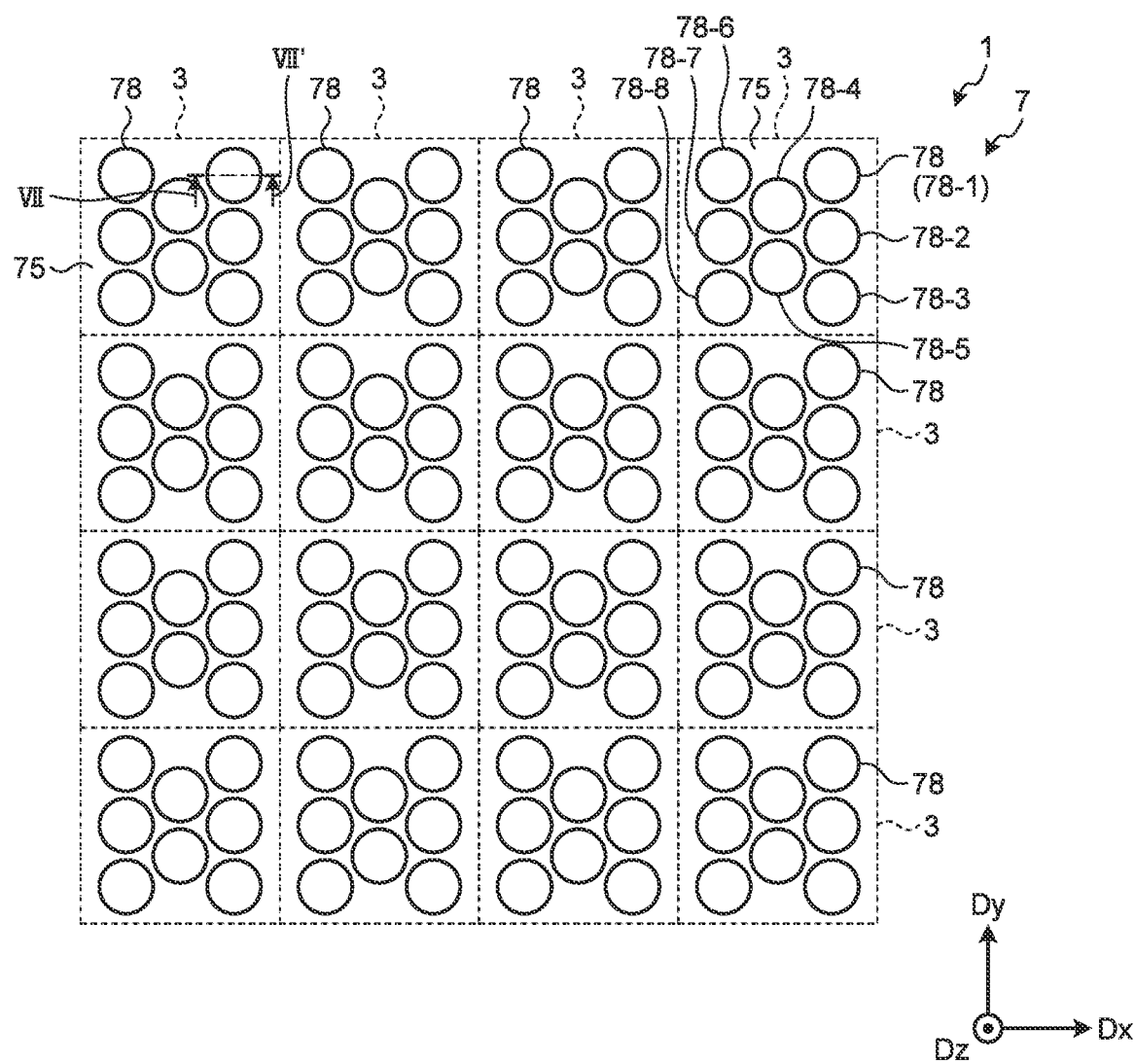
FIG. 6 is a plan view illustrating an optical filter according to the embodiment.

The following describes a detailed configuration of the detection elements 3 and the optical filter 7. FIG. 6 is a plan view illustrating the optical filter according to the embodiment.

As illustrated in FIG. 6, the optical filter 7 is provided so as to cover the detection elements 3 (photodiodes 30) arranged in a matrix having a row-column configuration. The optical filter 7 includes a first light-transmitting resin layer 74 and a second light-transmitting resin layer 75 that cover the detection elements 3, and includes the lenses 78 provided for each of the detection elements 3. A plurality of the lenses 78 are arranged for each of the detection elements 3. In the example illustrated in FIG. 6, eight lenses 78 of lenses 78-1, 78-2, . . . , 78-8 are provided for each of the detection elements 3. The lenses 78-1, 78-2, . . . , 78-8 are arranged in a triangular lattice pattern. As will be described later, each of the detection elements 3 has a plurality of detection regions (partial photodiodes 30S), thus having a structure in which the lenses 78 correspond to the detection regions in the detection element 3.

The number of the lenses 78 arranged in each of the detection elements 3 may be seven or smaller, or nine of larger so as to match the number of the detection regions. The arrangement of the lenses 78 may also be changed as appropriate depending on the configuration of the photodiodes 30.

Figure 7:
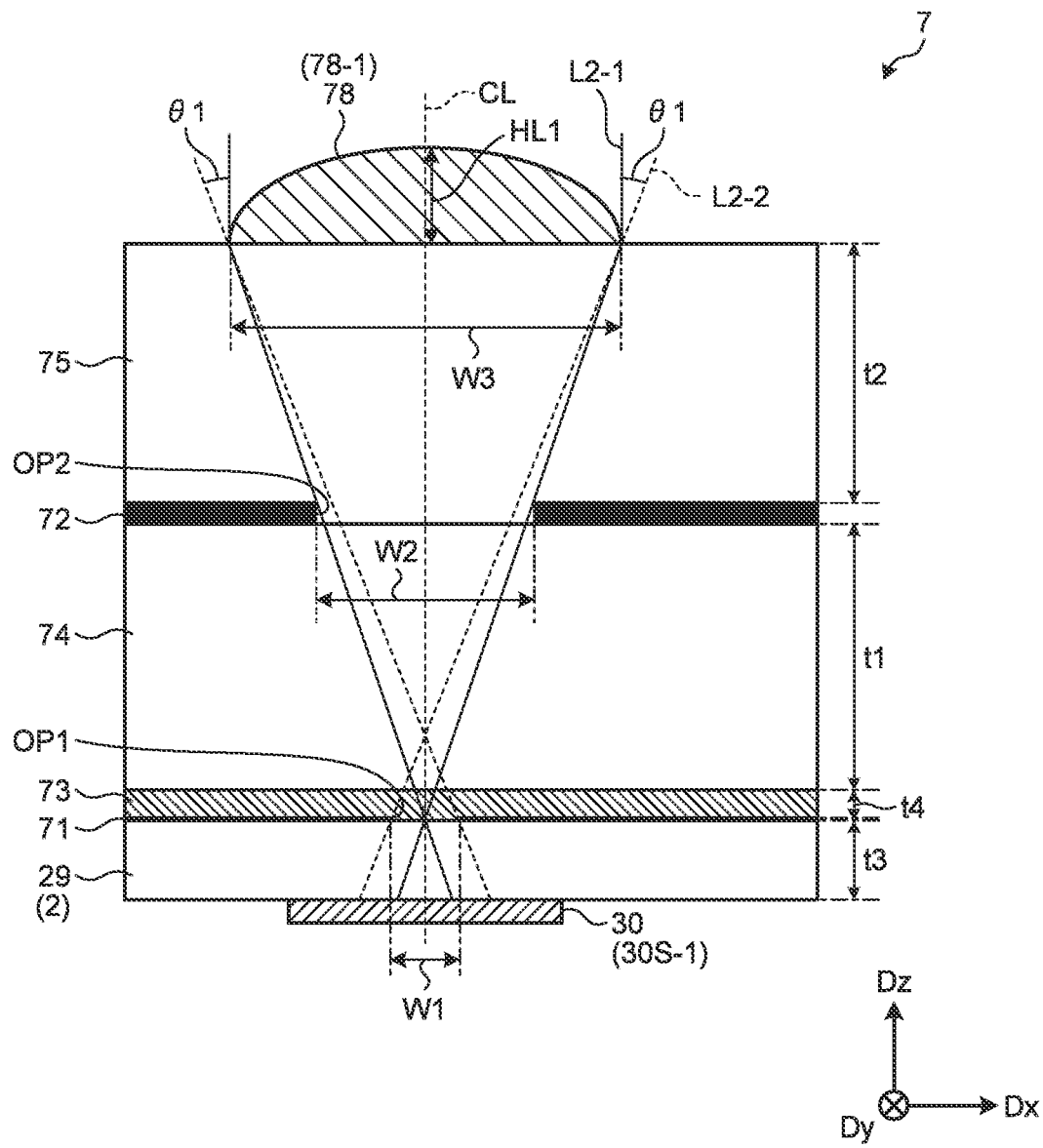
FIG. 7 is a sectional view illustrating the optical filter.

FIG. 7 is a sectional view illustrating the optical filter. FIG. 7 is a VII-VII' sectional view of FIG. 6. FIG. 7 illustrates a simplified configuration of the array substrate 2 and schematically illustrates the photodiode 30 (partial photodiode 30S-1) and a protective film 29 (organic protective film) covering the photodiode 30.

As illustrated in FIG. 7, the optical filter 7 includes the first light-blocking layer 71, the second light-blocking layer 72, a filter layer 73, the first light-transmitting resin layer 74, the second light-transmitting resin layer 75, and the lens 78. In the present embodiment, the first light-blocking layer 71, the filter layer 73, the first light-transmitting resin layer 74, the second light-blocking layer 72, the second light-transmitting resin layer 75, and the lens 78 are stacked on the protective film 29 in the order as listed.

The lens 78 is provided in a region overlapping the partial photodiode 30S-1 of one of the photodiodes 30. The lens 78 is a convex lens. An optical axis CL of the lens 78 is provided in a direction parallel to the third direction Dz and intersects the partial photodiode 30S-1. The lens 78 is provided on the second light-transmitting resin layer 75 so as to be directly in contact therewith. In the present embodiment, no light-blocking layer or the like is provided on the second light-transmitting resin layer 75 between the adjacent lenses 78.

The first light-blocking layer 71 is provided on the protective film 29 of the array substrate 2 so as to be directly in contact therewith. In other words, the first light-blocking layer 71 is provided between the photodiode 30 and the lens 78 in the third direction Dz. The first light-blocking layer 71 is provided with a first opening OP1 in a region overlapping the photodiode 30. The first opening OP1 is formed in a region overlapping the optical axis CL.

The first light-blocking layer 71 is provided on the protective film 29 of the array substrate 2 so as to be directly in contact therewith. The first light-blocking layer 71 is formed of, for example, a metal material such as molybdenum (Mo). This configuration allows the first light-blocking layer 71 to reflect the components of the light L2 traveling in the oblique directions other than the light L2 passing through the first opening OP1. Since the first light-blocking layer 71 is formed of a metal material, the first opening OP1 can be accurately formed to have a width W1 (diameter) in the first direction Dx. Thus, the first opening OP1 can be provided corresponding to the photodiode 30 even if the arrangement pitch and the area of the photodiodes 30 is small.

The first light-blocking layer 71 is formed by applying processing of forming the first opening OP1 in a metal material deposited by, for example, being sputtered on the protective film 29 of the array substrate 2, thus being different from a light-blocking layer formed by attaching what is called an external optical filter onto the protective film 29 of the array substrate 2. In the case of attaching the external optical filter to the array substrate 2, it is highly difficult, in particular, to match the position of a small opening of a light-blocking layer corresponding to the first opening OP1 of the first light-blocking layer 71 of the present embodiment with the position of the partial photodiode 30S-1. In contrast, since the optical filter 7 of the present embodiment is directly formed on the protective film 29 of the array substrate 2, the first opening OP1 can be more accurately provided on the partial photodiode 30S-1 than in the case of attaching the external optical filter.

In addition, unlike the second light-blocking layer 72 formed of a resin material to be described later, the first light-blocking layer 71 is formed of a metal material. Therefore, the first light-blocking layer 71 can be formed to be thinner than the second light-blocking layer 72 and can have the first opening OP1 formed therein that is smaller than a second opening OP2 formed in the second light-blocking layer 72. The thickness of the first light-blocking layer 71 is equal to or less than one tenth the thickness of the second light-blocking layer 72. As an example, the thickness of the first light-blocking layer 71 is equal to or greater than 0.055 μm, and is, for example, 0.065 μm, and the thickness of the second light-blocking layer 72 is, for example, 1 μm. The first light-blocking layer 71 is formed to be much thinner than the second light-blocking layer 72.

The filter layer 73 is provided on the first light-blocking layer 71 so as to be directly in contact therewith. In other words, the filter layer 73 is provided between the first light-blocking layer 71 and the first light-transmitting resin layer 74 in the third direction Dz. The filter layer 73 is a filter that blocks light in a predetermined wavelength band. The filter layer 73 is, for example, an infrared (IR) cut filter that is formed of a resin material colored in green and blocks infrared rays. With this configuration, the optical filter 7 can increase the detection sensitivity by allowing, for example, a component of the light L2 in a wavelength band required for the fingerprint detection to enter the photodiode 30.

The first light-transmitting resin layer 74 is provided on the filter layer 73 so as to be directly in contact therewith. In other words, the first light-transmitting resin layer 74 is provided between the first light-blocking layer 71 and the second light-blocking layer 72 in the third direction Dz. The first light-transmitting resin layer 74 and the second light-transmitting resin layer 75 are formed of, for example, a light-transmitting acrylic resin.

The second light-blocking layer 72 is provided on the first light-transmitting resin layer 74 so as to be directly in contact therewith. In other words, the second light-blocking layer 72 is provided between the first light-blocking layer 71 and the lens 78 in the third direction Dz. The second light-blocking layer 72 is provided with the second opening OP2 in a region overlapping the photodiode 30 and the first opening OP1. The second opening OP2 is formed in a region overlapping the optical axis CL. More preferably, the center of the second opening OP2 and the center of the first opening OP1 are provided so as to overlap the optical axis CL.

The second light-blocking layer 72 is formed of, for example, a resin material colored in black. With the above-described configuration, the second light-blocking layer 72 serves as a light-absorbing layer that absorbs the components of the light L2 traveling in the oblique directions other than the light L2 passing through the second opening OP2. The second light-blocking layer 72 also absorbs light reflected by the first light-blocking layer 71. With this configuration, as compared with a configuration in which the second light-blocking layer 72 is formed of a metal material, the light reflected by the first light-blocking layer 71 can be restrained from being repeatedly reflected a plurality of times and traveling as stray light through the first light-transmitting resin layer 74 to enter the other photodiodes 30. The second light-blocking layer 72 can also absorb external light incident between the adjacent lenses 78. Thus, light reflected by the second light-blocking layer 72 can be restrained as compared with the configuration in which the second light-blocking layer 72 is formed of a metal material. However, the second light-blocking layer 72 is not limited to the example of being formed of a resin material colored in black and may be formed of a metal material having blackened surfaces.

The second light-transmitting resin layer 75 is provided on the second light-blocking layer 72 so as to be directly in contact therewith. In other words, the second light-transmitting resin layer 75 is provided between the second light-blocking layer 72 and the lens 78.

The same material as that of the first light-transmitting resin layer 74 is used for the second light-transmitting resin layer 75, and thus, the refractive index of the second light-transmitting resin layer 75 is substantially equal to the refractive index of the first light-transmitting resin layer 74. With this configuration, the light L2 can be retrained from being reflected on an interface between the first light-transmitting resin layer 74 and the second light-transmitting resin layer 75 in the second opening OP2. However, the present embodiment is not limited to this configuration. The first light-transmitting resin layer 74 and the second light-transmitting resin layer 75 may be formed of different materials, and the refractive index of the first light-transmitting resin layer 74 may differ from the refractive index of the second light-transmitting resin layer 75.

In the present embodiment, the width decreases in the order of a width W3 (diameter) in the first direction Dx of the lens 78, a width W2 (diameter) in the first direction Dx of the second opening OP2, and the width W1 (diameter) in the first direction Dx of the first opening OP1. The width W1 (diameter) in the first direction Dx of the first opening OP1 is less than the width in the first direction Dx of the partial photodiode 30S-1 of the photodiode 30. The width W1 is from 2 μm to 10 μm, and is, for example, approximately 3.5 μm. The width W2 is from 3 μm to 20 μm, and is, for example, approximately 10.0 μm. The width W3 is from 10 μm to 50 μm, and is, for example, approximately 21.9 μm.

A thickness t2 of the second light-transmitting resin layer 75 illustrated in FIG. 7 is set to be substantially the same as a thickness t1 of the first light-transmitting resin layer 74 or less than the thickness t1 of the first light-transmitting resin layer 74. The thickness t1 of the first light-transmitting resin layer 74 and the thickness t2 of the second light-transmitting resin layer 75 are set to be greater than a thickness t4 of the filter layer 73. The thickness t1 of the first light-transmitting resin layer 74 and the thickness t2 of the second light-transmitting resin layer 75 are also greater than a thickness t3 of the protective film 29 of the array substrate 2. The thickness t1 and the thickness t2 are from 3 μm to 30 μm. The thickness t1 is, for example, approximately 18 μm. The thickness t2 is, for example, approximately 16.5 μm. The thickness t3 is from 1 μm to 10 μm, and is, for example, equal to or larger than 4.5 μm. The thickness t4 of the filter layer 73 is exemplarily from 1 μm to 5 μm, and is, for example, 1.35 μm.

With the above-described configuration, light L2-1 traveling in the third direction Dz among beams of the light L2 reflected by the object to be detected such as the finger Fg is condensed by the lens 78, and passes through the second opening OP2 and the first opening OP1 to enter the photodiode 30. Light L2-2 that tilts an angle θ1 from the third direction Dz also passes through the second opening OP2 and the first opening OP1 to enter the photodiode 30.

The film thickness of each of the layers of the optical filter 7, the width W1 of the first opening OP1, and the width W2 of the second opening OP2 can be changed as appropriate depending on characteristics required for the optical filter 7.

Figure 8:
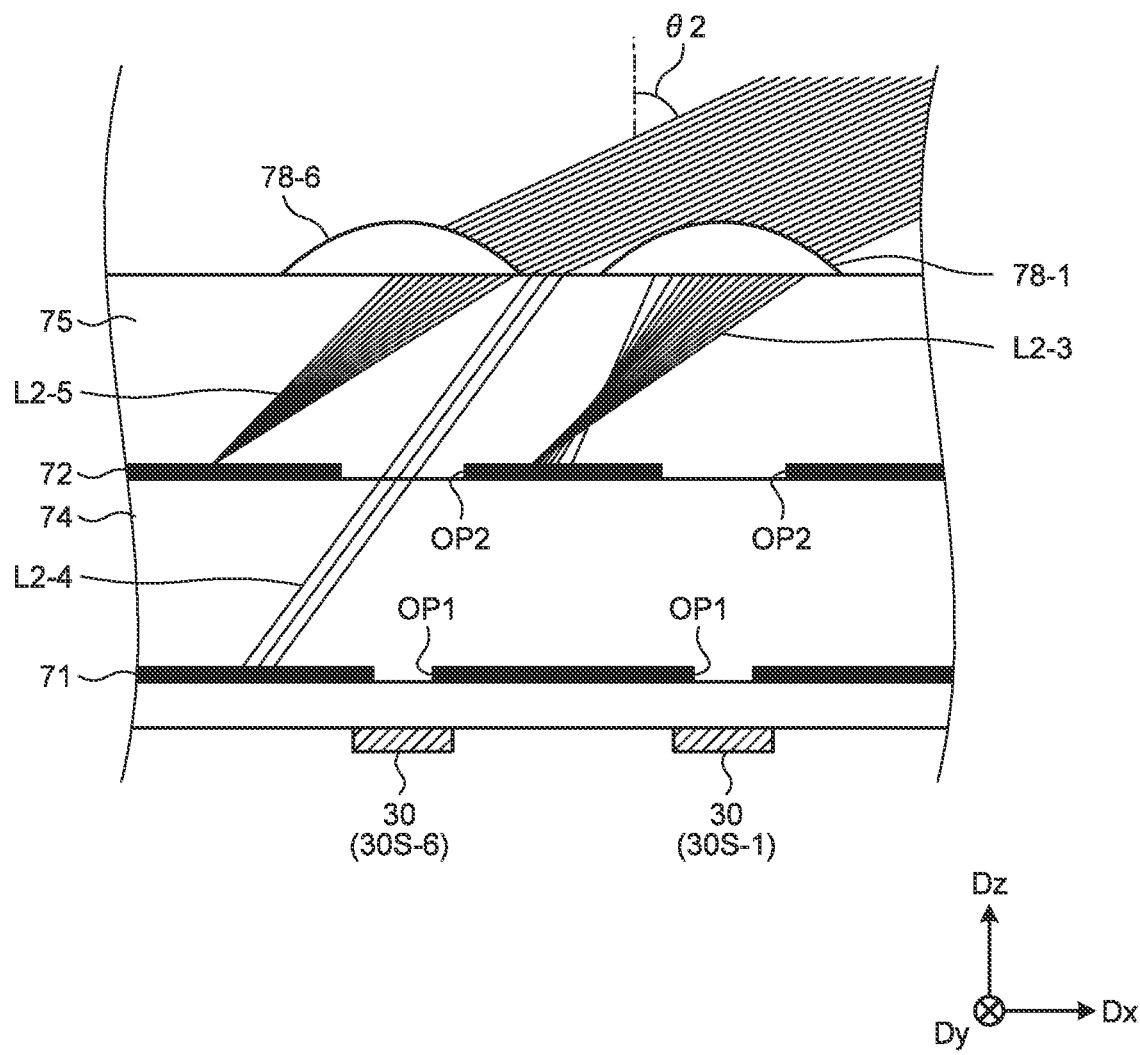
FIG. 8 is an explanatory diagram for schematically explaining travel of light when the light is incident on the optical filter in an oblique direction.

FIG. 8 is an explanatory diagram for schematically explaining travel of light when the light is incident on the optical filter in an oblique direction. FIG. 8 schematically illustrates a sectional structure of the two adjacent lenses 78-1 and 78-6. The lenses 78-1 and 78-6 are provided in positions overlapping partial photodiodes 30S-1 and 30S-6, respectively, of the photodiode 30. FIG. 8 also illustrates a case where the light L2 traveling in a direction oblique to the third direction Dz is incident on the optical filter 7. In the example illustrated in FIG. 8, an angle θ2 formed by the light L2 and the third direction Dz is 65 degrees.

As illustrated in FIG. 8, the light L2 that has entered the lenses 78-1 and 78-6 in the oblique direction is condensed as light L2-3 and L2-5, respectively, and is blocked by the second light-blocking layer 72. The light L2 that has entered the second light-transmitting resin layer 75 between the adjacent lenses 78 is refracted at the upper surface of the second light-transmitting resin layer 75 and travels in the second light-transmitting resin layer 75 as light L2-4. A part of the light L2-4 is blocked by the second light-blocking layer 72. A component of the light L2-4 that has passed through the second opening OP2 is blocked by the first light-blocking layer 71.

As described above, since the first light-blocking layer 71 and the second light-blocking layer 72 are provided, the optical filter 7 can effectively block the light L2 incident from the oblique direction and reduce occurrence of what is called crosstalk as compared with a case where the optical filter 7 is formed including only one light-blocking layer (for example, in a case where the optical filter 7 is not provided with the second light-blocking layer 72 and is formed including only the first light-blocking layer 71 in FIG. 8).

Even in a case where the first light-blocking layer 71 and the second light-blocking layer 72 are provided, the light L2 incident in the direction parallel to the third direction Dz can efficiently enter the partial photodiodes 30S by being restrained from being blocked by the first light-blocking layer 71 and the second light-blocking layer 72. As described above, the detection device 1 can reduce the occurrence of the crosstalk to improve the detection accuracy.

The optical filter 7 is integrally formed with the array substrate 2. That is, the first light-blocking layer 71 of the optical filter 7 is provided on the protective film 29 so as to be directly in contact therewith, and any member such as an adhesive layer is not provided between the first light-blocking layer 71 and the protective film 29. The optical filter 7 is directly formed as a film on the array substrate 2 and is formed by being subjected to a process such as patterning. Therefore, the positional accuracy of the first openings OP1, the second openings OP2, and the lenses 78 of the optical filter 7 with respect to the photodiodes 30 can be more improved than the case of attaching the optical filter 7 as a separate component to the array substrate 2. However, the optical filter 7 is not limited to this configuration, and may be what is called an external optical filter that is attached onto the protective film 29 of the array substrate 2 with an adhesive layer interposed therebetween.

The optical filter 7 is also not limited to the configuration including the first light-blocking layer 71 and the second light-blocking layer 72 and may be formed including only one light-blocking layer. Although the filter layer 73 is provided between the first light-blocking layer 71 and the first light-transmitting resin layer 74, the position of the filter layer 73 is not limited to this position. The position of the filter layer 73 can be changed as appropriate depending on the characteristics required for the optical filter 7 and the manufacturing process. The optical filter 7 is not limited to the configuration in which the light-blocking layers and the light-transmitting resin layers are stacked. The optical filter 7 may have, for example, a light guide column structure. That is, the optical filter 7 may have a configuration including a non-light-transmitting member formed of a black resin material and a plurality of light-transmitting regions (light guide columns) formed into columnar shapes penetrating upper and lower surfaces of the non-light-transmitting member.

Figure 9:
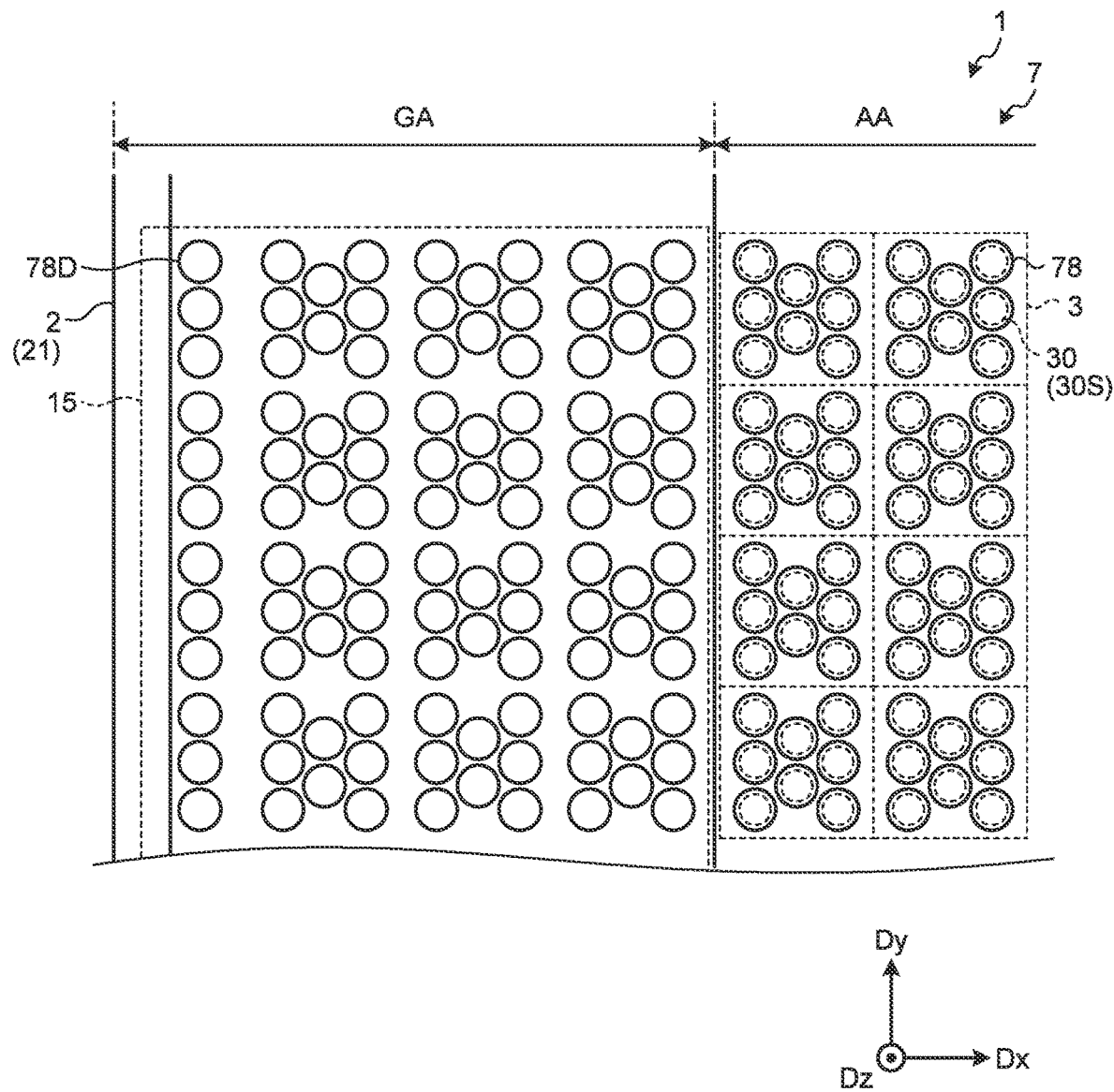
FIG. 9 is a plan view illustrating an array substrate and the optical filter in a peripheral region.

The following describes a configuration of the dummy lenses 78D provided in the peripheral region GA. FIG. 9 is a plan view illustrating the array substrate and the optical filter in the peripheral region. FIG. 9 schematically illustrates the photodiodes 30 (partial photodiode 30S) with dotted lines.

As illustrated in FIG. 9, the dummy lenses 78D are provided in the peripheral region GA and are provided so as not to overlap the photodiodes 30 (partial photodiodes 30S) in the detection region AA. The dummy lenses 78D are provided so as to overlap the scan line drive circuit 15 provided in the peripheral region GA. As described above, the scan line drive circuit 15 is a circuit that is coupled to the scan lines (the read control scan line GLrd and the reset control scan line GLrst (refer to FIG. 5)) provided in the detection region AA and drives the scan lines. The arrangement pitch and the arrangement pattern of the dummy lenses 78D are set to the same arrangement pitch and the same arrangement pattern as those of the lenses 78 in the detection region AA. For example, approximately 10 columns (approximately three detection elements 3) of the dummy lenses 78D are arranged in the first direction Dx.

Figure 10:
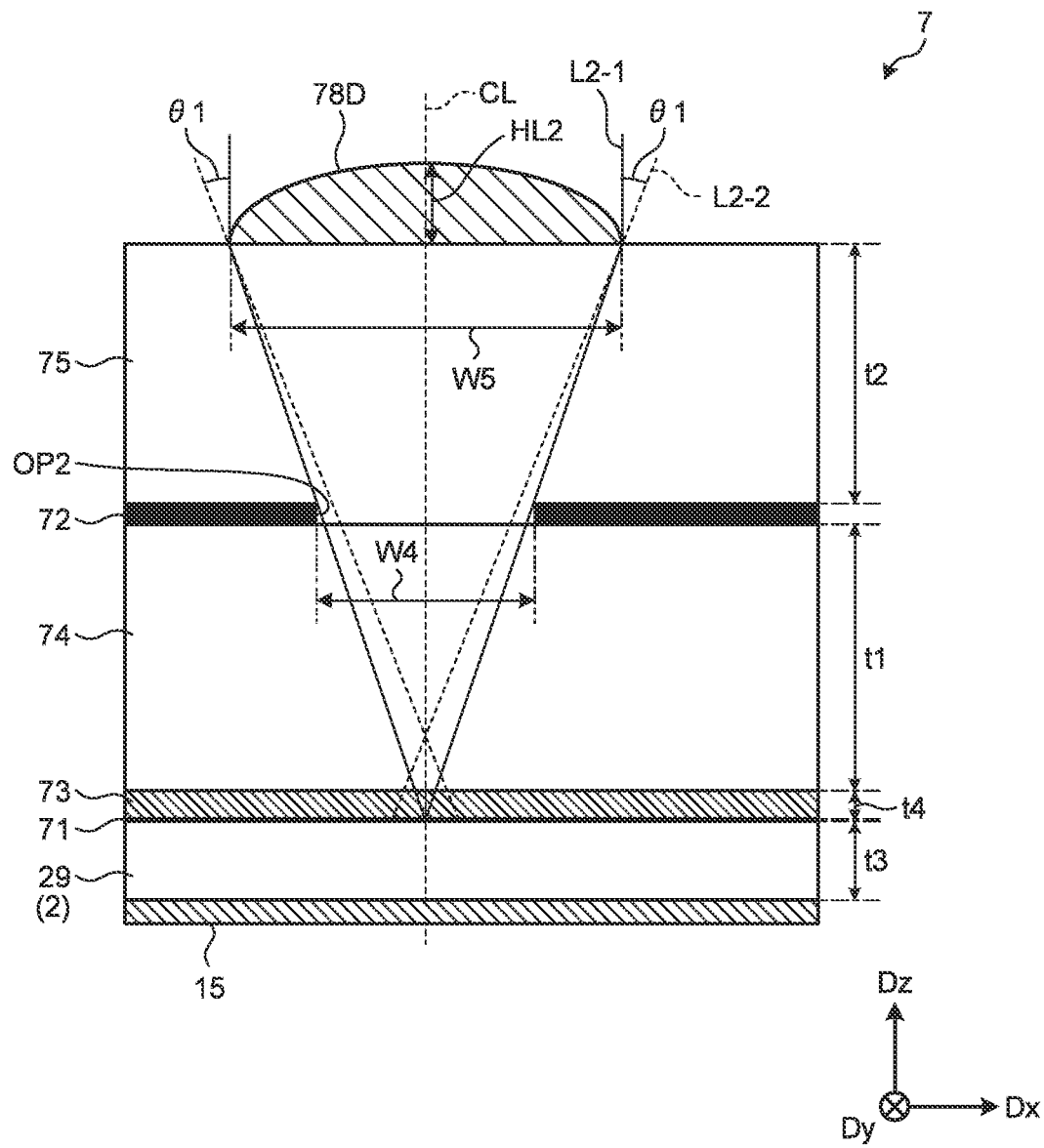
FIG. 10 is a sectional view illustrating the optical filter in the peripheral region.

FIG. 10 is a sectional view illustrating the optical filter in the peripheral region. As illustrated in FIG. 10, each of the dummy lenses 78D is provided in the same layer as that of the lens 78 (refer to FIG. 7) on the second light-transmitting resin layer 75. A height HL2 of at least one of the dummy lenses 78D differs from a height HL1 of the lens 78 (refer to FIG. 7). In FIG. 10, the height HL2 of the dummy lens 78D is set to be less than the height HL1 of the lens 78 (refer to FIG. 7). A width W5 of the dummy lens 78D is equal to the width W3 of the lens 78. However, the width W5 of the dummy lens 78D may differ from the width W3 of the lens 78. In more detail, the shape of the dummy lens 78D is more similar to the shape of the lens 78 as the dummy lens 78D is closer to the detection region AA. The shape of the dummy lens 78D is more dissimilar to the shape of the lens 78 as the dummy lens 78D is more away from the detection region AA. As a result, the height HL2 and the width W5 of the dummy lens 78D are more approximate to the height HL1 and the width W3 of the lens 78 as the dummy lens 78D is closer to the detection region AA, and are more different from the height HL1 and the width W3 of the lens 78 as the dummy lens 78D is more away from the detection region AA. That is, the shape of the dummy lens 78D located near the detection region AA is substantially the same as that of the lens 78 in the detection region, and the shape of the lens 78 near the peripheral region GA is substantially the same as that of the lens 78 in the middle of the detection region AA. This configuration reduces, in particular, a variation between the shape of the lens 78 provided in a position of the detection region AA closest to the peripheral region GA and the shape of the lens 78 in a middle portion of the detection region AA.

In the peripheral region GA, the first light-blocking layer 71, the filter layer 73, the first light-transmitting resin layer 74, the second light-blocking layer 72, the second light-transmitting resin layer 75, and the dummy lens 78D are stacked on the protective film 29 of the array substrate 2 in the order as listed. That is, in the detection device 1, the multilayered structure in the peripheral region GA is formed in the same manner as the multilayered structure in the detection region AA. Each of the first light-blocking layer 71, the filter layer 73, the first light-transmitting resin layer 74, the second light-blocking layer 72, and the second light-transmitting resin layer 75 is formed so as to extend over the detection region AA and regions of the peripheral region GA that overlap the dummy lenses 78D. This configuration reduces variations in thickness and surface state between the peripheral region GA and the detection region AA.

More specifically, the second light-blocking layer 72 is provided with the second opening OP2 in a region overlapping the dummy lens 78D. This configuration can reduce variations (variations in thickness and surface state) between the multilayered structure of the second light-blocking layer 72 (second opening OP2), the second light-transmitting resin layer 75, and the lens 78 in the detection region AA and the multilayered structure of the second light-blocking layer 72 (second opening OP2), the second light-transmitting resin layer 75, and the dummy lens 78D in the peripheral region GA.

On the other hand, the first light-blocking layer 71 is not provided with the first opening OP1 in a region overlapping the dummy lens 78D. The first light-blocking layer 71 is provided so as to cover the region overlapping the dummy lens 78D. As a result, the first light-blocking layer 71 can block the light L2 that has passed through the dummy lens 78D and the second opening OP2, and thus, can restrain the light from entering the scan line drive circuit 15. The first light-blocking layer 71 is formed to be thinner than the second light-blocking layer 72. Therefore, even though the first opening OP1 is not provided, the variations (variations in thickness and surface state) are hardly generated between the multilayered structures in the peripheral region GA and the detection region AA.

When the second light-blocking layer 72 is formed of a metal material so as to be thin in the same manner as the first light-blocking layer 71, the second opening OP2 need not be provided in the region overlapping the dummy lens 78D. That is, the configuration only needs to be such that at least one of the first opening OP1 of the first light-blocking layer 71 or the second opening OP2 of the second light-blocking layer 72 is not provided in the regions overlapping the dummy lenses 78D. In other words, at least one of the first light-blocking layer 71 or the second light-blocking layer 72 only needs to be provided so as to cover the regions overlapping the dummy lenses 78D.

The lenses 78 and the dummy lenses 78D are formed in the same manufacturing process. Surfaces of the lenses 78 and the dummy lenses 78D are formed into curved surface shapes, for example, by being patterned using a photolithography technique and etching, and by being baked. In the manufacturing process of the optical filter 7 and the array substrate 2, the lenses 78 located in the middle portion of the array substrate 2 have a different arrangement pitch (arrangement density) from that of the dummy lenses 78D located in a peripheral portion of the array substrate 2. Specifically, as for the lenses 78 located in the middle portion of the array substrate 2, the lenses 78 are provided in the same arrangement pattern in four directions. As for the dummy lenses 78D located in the peripheral portion of the array substrate 2, as illustrated, for example, in FIG. 9, the dummy lenses 78D and the lenses 78 are provided in the same arrangement pattern on one side in the first direction Dx (on the middle portion side of the array substrate 2) whereas the dummy lenses 78D are not provided on the other side in the first direction Dx (on an edge side of the array substrate 2).

The degree of influence exerted from surrounding structures to the lenses 78 (and the dummy lenses 78D) differs between the middle portion and the peripheral portion of the array substrate 2. As a result, variations in process conditions (such as heat, light, and chemical solutions) may be generated between the middle portion and the peripheral portion of the array substrate 2. In the present embodiment, the dummy lenses 78D are provided in the peripheral region GA. Therefore, at least in the detection region AA, the lenses 78 located in the middle portion of the detection region AA and the lenses 78 located in the peripheral portion of the detection region AA are arranged such that the surrounding lenses 78 (and the dummy lenses 78D) have the same arrangement pitch (arrangement density).

Consequently, even when the variations in the process conditions occur, variations in the shapes of the lenses 78 between the middle portion and the peripheral portion of the detection region AA are reduced. As a result, in particular, variations are reduced between the intensity of the light L2 condensed by the lenses 78 and incident on the photodiodes 30 in the detection elements 3 provided in the peripheral portion of the detection region AA and the intensity of the light L2 incident on the photodiodes 30 in the middle portion of the detection region AA. Thus, the detection device 1 can also improve the detection accuracy in the peripheral portion of the detection region AA. As described above, at least some of the dummy lenses 78D may be formed into shapes (heights and widths) different from those of the lenses 78 due to the variations in the process conditions. Even in this case, since the dummy lenses 78D are provided so as not to overlap the photodiodes 30, deterioration in the detection accuracy can be restrained.

Figure 11:
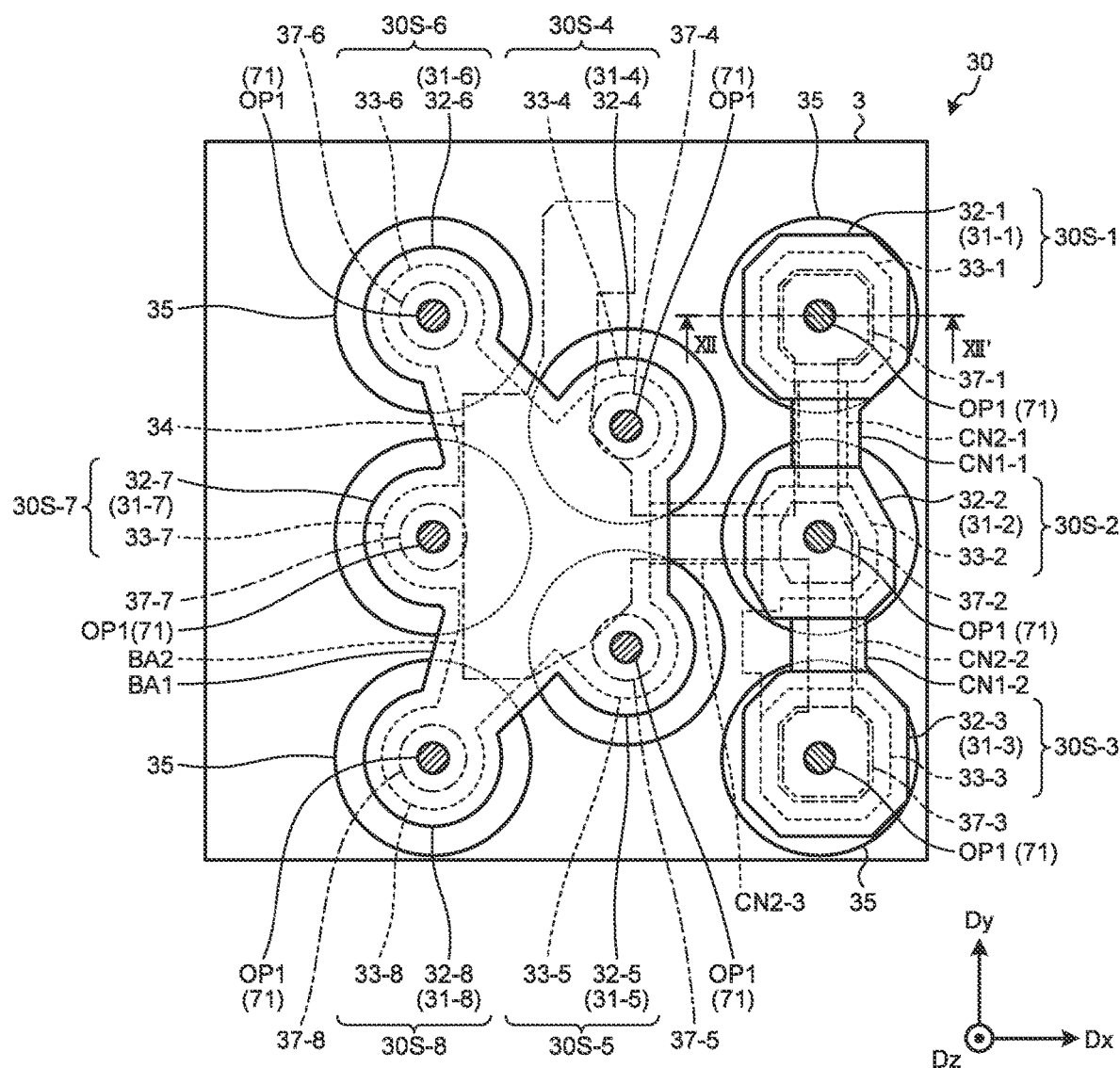
FIG. 11 is a plan view illustrating the detection element.

FIG. 11 is a plan view illustrating the detection element. For ease of viewing, FIG. 11 is illustrated without the transistors included in the detection element 3 and the various types of wiring including, for example, the scan lines and the signal lines. Each of the detection elements 3 is defined, for example, as a region surrounded by the scan lines and the signal lines.

As illustrated in FIG. 11, the photodiode 30 includes a plurality of partial photodiodes 30S-1, 30S-2, . . . , 30S-8. The partial photodiodes 30S-1, 30S-2, . . . , 30S-8 are arranged in a triangular lattice pattern. The lenses 78-1, 78-2, . . . , 78-8, the first openings OP1 of the first light-blocking layer 71, and the second openings OP2 of the second light-blocking layer 72, which are illustrated in FIG. 6, are provided so as to overlap the partial photodiodes 30S-1, 30S-2, . . . , 30S-8, respectively.

More specifically, the partial photodiodes 30S-1, 30S-2, and 30S-3 are arranged in the second direction Dy. The partial photodiodes 30S-4 and 30S-5 are arranged in the second direction Dy and are adjacent to an element column made up of the partial photodiodes 30S-1, 30S-2, and 30S-3 in the first direction Dx. The partial photodiodes 30S-6, 30S-7, and 30S-8 are arranged in the second direction Dy and are adjacent to an element column made up of the partial photodiodes 30S-4 and 30S-5 in the first direction Dx. The positions in the second direction Dy of the partial photodiodes 30S are arranged in a staggered manner in the adjacent element columns.

The light L2 is incident on the partial photodiodes 30S-1, 30S-2, . . . , 30S-8 from the lenses 78-1, 78-2, . . . , 78-8. The partial photodiodes 30S-1, 30S-2, . . . , 30S-8 are electrically coupled together to serve as one photodiode 30. That is, signals output from the respective partial photodiodes 30S-1, 30S-2, . . . , 30S-8 are integrated, and one detection signal Vdet is output from the photodiode 30. In the following description, the partial photodiodes 30S-1, 30S-2, . . . , 30S-8 will be simply referred to as "partial photodiodes 30S" when they need not be distinguished from one another.

Each of the partial photodiodes 30S includes an i-type semiconductor layer 31, an n-type semiconductor layer 32, and a p-type semiconductor layer 33. The i-type semiconductor layer 31 and the n-type semiconductor layer 32 are, for example, of amorphous silicon (a-Si). The p-type semiconductor layer 33 is, for example, of polysilicon (p-Si). The material of each of the semiconductor layers is not limited to those mentioned above and may be, for example, polysilicon or microcrystalline silicon.

The a-Si of the n-type semiconductor layer 32 is doped with impurities to form an n+ region. The p-Si of the p-type semiconductor layer 33 is doped with impurities to form a p+ region. The i-type semiconductor layer 31 is, for example, a non-doped intrinsic semiconductor, and has lower conductivity than that of the n-type semiconductor layer 32 and the p-type semiconductor layer 33.

In FIG. 11, a dot-dash line indicates an effective sensor region 37 in which the p-type semiconductor layer 33 and the i-type semiconductor layer 31 (and the n-type semiconductor layer 32) are coupled together. The first opening OP1 of the first light-blocking layer 71 is provided so as to overlap the sensor region 37.

The partial photodiodes 30S have different shapes from one another in the plan view. The partial photodiodes 30S-1, 30S-2, and 30S-3 are each formed in a polygonal shape. The partial photodiodes 30S-4, 30S-5, 30S-6, 30S-7, and 30S-8 are each formed in a circular shape or a semi-circular shape.

The n-type semiconductor layers 32 of the partial photodiodes 30S-1, 30S-2, and 30S-3 arranged in the second direction Dy are electrically coupled together through joints CN1-1 and CN1-2. The p-type semiconductor layers 33 of the partial photodiodes 30S-1, 30S-2, and 30S-3 are electrically coupled together through joints CN2-1 and CN2-2.

The n-type semiconductor layers 32 (i-type semiconductor layers 31) of the partial photodiodes 30S-4, 30S-5, 30S-6, 30S-7, and 30S-8 are electrically coupled together through a base BA1. The p-type semiconductor layers 33 of the partial photodiodes 30S-4, 30S-5, 30S-6, 30S-7, and 30S-8 are electrically coupled together through a base BA2. Each of the base BA1 and the base BA2 is formed in a substantially pentagonal shape and is provided, at the apex positions thereof, with the partial photodiodes 30S-4, 30S-5, 30S-6, 30S-7, and 30S-8. The base BA2 is electrically coupled to the p-type semiconductor layers 33 of the partial photodiodes 30S-1, 30S-2, and 30S-3 through a joint CN2-3. With the above-described configuration, the partial photodiodes 30S constituting one photodiode 30 are electrically coupled together.

The lower conductive layers 35 are respectively provided in regions overlapping the partial photodiodes 30S. The lower conductive layers 35 all have a circular shape in the plan view. That is, the lower conductive layer 35 may have a shape different from that of the partial photodiode 30S. For example, each of the partial photodiodes 30S-1, 30S-2, and 30S-3 has a polygonal shape in the plan view and is formed on the circular lower conductive layer 35. Each of the partial photodiodes 30S-4, 30S-5, 30S-6, 30S-7, and 30S-8 has a circular shape or a semi-circular shape having a diameter less than that of the lower conductive layer 35 in the plan view and is formed above the circular lower conductive layer 35. The lower conductive layer 35 is supplied with the reference potential VCOM that is the same as the potential of the p-type semiconductor layer 33, and thus, can reduce the parasitic capacitance between the lower conductive layer 35 and the p-type semiconductor layer 33.

The upper conductive layer 34 electrically couples together the n-type semiconductor layers 32 of the partial photodiode 30S. The upper conductive layer 34 is electrically coupled to the transistors (the reset transistor Mrst and the source follower transistor Msf (refer to FIG. 5)) of the array substrate 2. The upper conductive layer 34 may be provided in any manner and may be provided, for example, so as to cover a portion of the partial photodiode 30S, or so as to cover the entire partial photodiode 30S.

In the present embodiment, the partial photodiode 30S is provided for each of the lenses 78 and each of the first openings OP1. This configuration can reduce portions of the semiconductor layers and wiring layers in a region not overlapping the lenses 78 and the first openings OP1 as compared with a configuration in which the photodiode 30 is formed of a solid film having, for example, a quadrilateral shape so as to cover the entire detection element 3 in the plan view. Thus, the parasitic capacitance of the photodiode 30 can be reduced.

The planar structure of the photodiode 30 illustrated in FIG. 11 is merely an example, and can be changed as appropriate. The number of the partial photodiodes 30S included in each of the photodiodes 30 may be seven or less, or nine of greater. The arrangement of the partial photodiodes 30S is not limited to the triangular lattice pattern. The partial photodiodes 30S may be arranged, for example, in a matrix having a row-column configuration. The arrangement of the lenses 78, the first openings OP1, and the second openings OP2 included in the optical filter 7 can also be changed as appropriate depending on the configuration of the partial photodiodes 30S.

Figure 12:
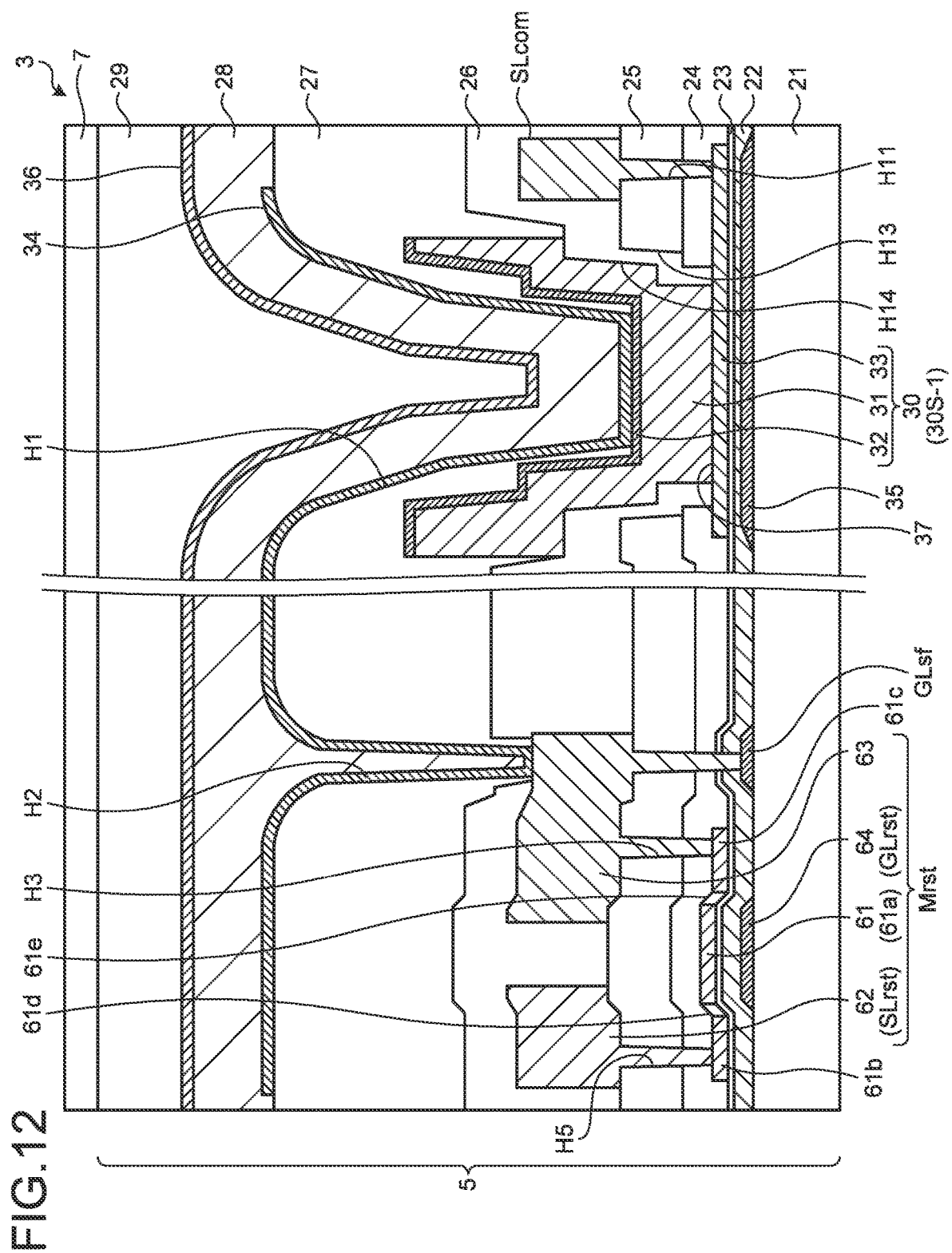
FIG. 12 is a XII-XII' sectional view of FIG. 11.

FIG. 12 is a XII-XII' sectional view of FIG. 11. FIG. 12 illustrates the sectional configuration of the partial photodiode 30S-1, and also the sectional configuration of the reset transistor Mrst included in the detection element 3. The source follower transistor Msf and the read transistor Mrd included in the detection element 3 also have a sectional configuration similar to that of the reset transistor Mrst.

The substrate 21 is an insulating substrate and is formed using, for example, a glass substrate of, for example, quartz or alkali-free glass, or a resin substrate of, for example, polyimide. The gate electrode 64 is provided on the substrate 21. Insulating films 22 and 23 are provided on the substrate 21 so as to cover the gate electrode 64. The insulating films 22 and 23 and insulating films 24, 25, and 26 are inorganic insulating films, and are formed of, for example, a silicon oxide ($SiO_2$) or a silicon nitride (SiN).

A semiconductor layer 61 is provided on the insulating film 23. For example, polysilicon is used as the semiconductor layer 61. The semiconductor layer 61 is, however, not limited thereto, and may be formed of, for example, a microcrystalline oxide semiconductor, an amorphous oxide semiconductor, or low-temperature polycrystalline silicon (LTPS). The reset transistor Mrst has a bottom-gate structure in which the gate electrode 64 is provided on the lower side of the semiconductor layer 61. However, the source follower transistor Msf may have a top-gate structure in which the gate electrode 64 is provided on the upper side of the semiconductor layer 61, or a dual-gate structure in which the gate electrodes 64 are provided on the upper side and the lower side of the semiconductor layer 61.

The semiconductor layer 61 has a channel region 61a, high-concentration impurity regions 61b and 61c, and low-concentration impurity regions 61d and 61e. The channel region 61a is, for example, a non-doped intrinsic semiconductor or a low-impurity region and has lower conductivity than that of the high-concentration impurity regions 61b and 61c and the low-concentration impurity regions 61d and 61e. The channel region 61a is provided in a region overlapping the gate electrode 64.

The insulating films 24 and 25 are provided on the insulating film 23 so as to cover the semiconductor layer 61. The source electrode 62 and the drain electrode 63 are provided on the insulating film 25. The source electrode 62 is coupled to the high-concentration impurity region 61b of the semiconductor layer 61 through a contact hole H5. The drain electrode 63 is coupled to the high-concentration impurity region 61c of the semiconductor layer 61 through a contact hole H3. The source electrode 62 and the drain electrode 63 are each formed of, for example, a multilayered film of Ti—Al—Ti or Ti—Al having a multilayered structure of titanium and aluminum.

A gate line GLsf is wiring coupled to the gate of the source follower transistor Msf. The gate line GLsf is provided in the same layer as that of the gate electrode 64. The drain electrode 63 (coupling wiring SLcn) is coupled to the gate line GLsf through a contact hole penetrating the insulating films 22 to 25.

The following describes the sectional configuration of the photodiode 30. While the partial photodiode 30S-1 is described with reference to FIG. 12, the description of the partial photodiode 30S-1 can also be applied to the other partial photodiodes 30S-2, . . . , 30S-8. As illustrated in FIG. 12, the lower conductive layer 35 is provided in the same layer as that of the gate electrode 64 and the gate line GLsf on the substrate 21. The insulating films 22 and 23 are provided on the lower conductive layer 35. The photodiode 30 is provided on the insulating film 23. In other words, the lower conductive layer 35 is provided between the substrate 21 and the p-type semiconductor layer 33. The lower conductive layer 35 is formed of the same material as that of the gate electrode 64, and thereby serves as a light-blocking layer. Thus, the lower conductive layer 35 can restrain light from entering the photodiode 30 from the substrate 21 side.

The i-type semiconductor layer 31 is provided between the p-type semiconductor layer 33 and the n-type semiconductor layer 32 in the third direction Dz. In the present embodiment, the p-type semiconductor layer 33, the i-type semiconductor layer 31, and the n-type semiconductor layer 32 are stacked on the insulating film 23 in the order as listed. The effective sensor region 37 illustrated in FIG. 11 is a region in which the i-type semiconductor layer 31 is coupled to the p-type semiconductor layer 33.

Specifically, the p-type semiconductor layer 33 is provided in the same layer as that of the semiconductor layer 61 on the insulating film 23. The insulating films 24, 25, and 26 are provided so as to cover the p-type semiconductor layer 33. The insulating films 24 and 25 are provided with a contact hole H13 in a position overlapping the p-type semiconductor layer 33. The insulating film 26 is provided on the insulating film 25 so as to cover the transistors including the reset transistor Mrst. The insulating film 26 covers side surfaces of the insulating films 24 and 25 forming an inner wall of the contact hole H13. The insulating film 26 is provided with a contact hole H14 in a position overlapping the p-type semiconductor layer 33.

The i-type semiconductor layer 31 is provided on the insulating film 26 and is coupled to the p-type semiconductor layer 33 through the contact hole H14 penetrating from the insulating film 24 to the insulating film 26. The n-type semiconductor layer 32 is provided on the i-type semiconductor layer 31.

An insulating film 27 is provided on the insulating film 26 so as to cover the photodiode 30. The insulating film 27 is provided so as to be directly in contact with the photodiode 30 and the insulating film 26. The insulating film 27 is formed of an organic material such as a photosensitive acrylic resin. The insulating film 27 is thicker than the insulating film 26. The insulating film 27 has a better step coverage property than that of inorganic insulating materials, and is provided so as to cover side surfaces of the i-type semiconductor layer 31 and the n-type semiconductor layer 32.

The upper conductive layer 34 is provided on the insulating film 27. The upper conductive layer 34 is formed of, for example, a light-transmitting conductive material such as indium tin oxide (ITO). The upper conductive layer 34 is provided along a surface of the insulating film 27 and is coupled to the n-type semiconductor layer 32 through a contact hole H1 provided in the insulating film 27. The upper conductive layer 34 is also electrically coupled to the drain electrode 63 of the reset transistor Mrst and the gate line GLsf through a contact hole H2 provided in the insulating film 27.

An insulating film 28 is provided on the insulating film 27 so as to cover the upper conductive layer 34. The insulating film 28 is an inorganic insulating film. The insulating film 28 is provided as a protective layer for restraining water from entering the photodiode 30. An overlapping conductive layer 36 is provided on the insulating film 28. The overlapping conductive layer 36 is formed of, for example, a light-transmitting conductive material such as ITO. The overlapping conductive layer 36 may be omitted.

The protective film 29 is provided on the insulating film 28 so as to cover the overlapping conductive layer 36. The protective film 29 is an organic conductive film. The protective film 29 is formed so as to planarize a surface of the detection device 1.

In the present embodiment, the p-type semiconductor layer 33 and the lower conductive layer 35 of the photodiode 30 are provided in the same layers as those of the transistors. Therefore, the manufacturing process can be simpler than in a case where the photodiode 30 is formed in layers different from those of the transistors.

The sectional configuration of the photodiode 30 illustrated in FIG. 12 is merely an example. The sectional configuration is not limited to this example. For example, the photodiode 30 may be provided in a layer different from those of the transistors or may be provided by including the p-type semiconductor layer 33, the i-type semiconductor layer 31, and the n-type semiconductor layer 32 stacked in this order on the insulating film 26.

As described above, the detection device 1 of the present embodiment includes the substrate 21 (array substrate 2) having the detection region AA, the photodiodes 30 provided in the detection region AA, the lenses 78 provided so as to overlap the respective photodiodes 30, and the dummy lenses 78D that are provided in the peripheral region GA between the outer perimeter of the detection region AA and the edges of the substrate 21 and are provided so as not to overlap the photodiodes 30.

Since the dummy lenses 78D are provided, this configuration can reduce the variation between the arrangement pitch of the lenses 78 in the middle portion of the detection region AA and the arrangement pitch of the lenses 78 (and the dummy lenses 78D) in the outer peripheral portion of the detection region AA. This configuration can reduce the variations in the process conditions between the middle portion and the outer peripheral portion of the detection region AA. As a result, the variations in the shapes of the lenses 78 in the detection region AA are reduced, and the detection device 1 can thus improve the detection accuracy.

Figure 13:
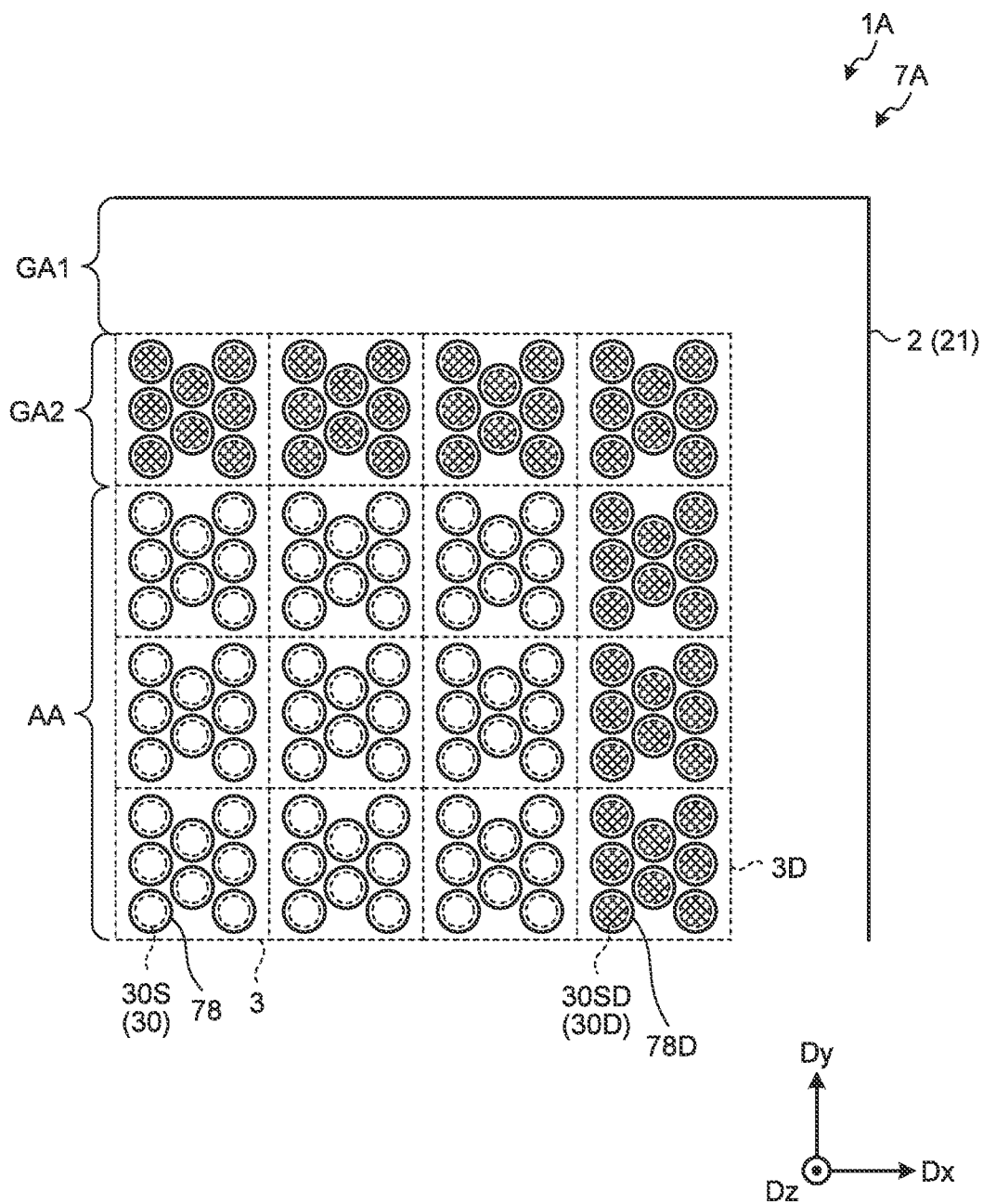
FIG. 13 is a plan view illustrating the array substrate and an optical filter according to a fourth modification of the embodiment.

FIG. 13 is a plan view illustrating the array substrate and an optical filter according to a fourth modification of the embodiment. As illustrated in FIG. 13, in a detection device 1A according to the fourth modification, the array substrate 2 has the detection region AA, a peripheral region GA1, and a dummy region GA2. In the same manner as in the embodiment described above, the detection region AA is provided with the photodiodes 30 and the lenses 78 overlapping the photodiodes 30.

The dummy region GA2 is provided between the detection region AA and the peripheral region GA1 and forms a rectangular frame shape that surrounds the detection region AA. The dummy region GA2 is provided between the outer perimeter of the detection region AA and the edges of the substrate 21. In other words, the peripheral region GA1 and the dummy region GA2 are included in the peripheral region GA (refer to FIGS. 2 and 3).

The dummy region GA2 is provided with dummy elements 3D that do not detect, for example, the fingerprint. Each of the dummy elements 3D includes dummy photodiodes 30D. Each of the dummy photodiodes 30D is a PIN photodiode similar to the photodiode 30 of the detection element 3. However, the dummy element 3D does not include the read transistor Mrd and the source follower transistor Msf (refer to FIG. 5). Thus, the dummy photodiode 30D of the dummy element 3D is not coupled to at least the output signal line SL (refer to FIG. 5) provided in the detection region AA. As a result, a signal (electrical charge) generated in the dummy photodiode 30D is not output as the detection signal Vdet to the output signal line SL. Although the detailed circuit configuration of the dummy element 3D is not described, the dummy element 3D may have any configuration as long as the configuration is a circuit configuration not serving as the detection element 3.

The dummy lens 78D of an optical filter 7A is provided so as to overlap a partial photodiode 30SD included in the dummy photodiode 30D. The arrangement pattern and the arrangement pitch of the dummy lenses 78D and the partial photodiodes 30SD are the same as the arrangement pattern and the arrangement pitch of the lenses 78 and the partial photodiodes 30S in the detection region AA. In FIG. 13, the dummy elements 3D are provided for one row and column around the detection region AA but may be provided, for example, for two or more rows and columns. The dummy lenses 78D and the partial photodiodes 30SD are more preferably provided for approximately 10 rows and columns around the detection region AA.

A region overlapping the dummy photodiode 30D of the partial photodiode 30SD is provided with the first light-blocking layer 71 and the second light-blocking layer 72 in the same manner as in the example illustrated in FIG. 10. Also in the present modification, the light L2 incident on the partial photodiode 30SD can be blocked by employing the configuration in which at least one of the first opening OP1 of the first light-blocking layer 71 or the second opening OP2 of the second light-blocking layer 72 is not formed.

In the present modification, the dummy photodiodes 30D are provided in regions overlapping the dummy lenses 78D. Therefore, variations can be reduced between the multilayered structure of the photodiodes 30 and the lenses 78 in the middle portion of the detection region AA and the multilayered structure of the dummy photodiodes 30D and the dummy lenses 78D in the dummy region GA2. As a result, the shape of the lenses 78 in the peripheral portion of the detection region AA is formed into the same shape as the shape of the lenses 78 in the middle portion of the detection region AA, and the variation is reduced between the detection accuracy in the peripheral portion of the detection region AA and the detection accuracy in the middle portion of the detection region AA. In particular, the detection accuracy in the peripheral portion of the detection region AA can be restrained from deteriorating. Since the dummy photodiodes 30D are provided, the variation in the arrangement pitch (arrangement density) of the photodiodes 30 in the detection region AA is reduced. Consequently, the variation is reduced between the parasitic capacitance generated in the photodiodes 30 located in the middle portion of the detection region AA and the parasitic capacitance generated in the photodiodes 30 located in the peripheral portion of the detection region AA. As a result, the detection device 1A can reduce the variation in the detection signals Vdet of the photodiodes 30, and thus, can improve the detection accuracy.

The present modification can be combined with the above-described embodiment. That is, in one detection device 1, the dummy lenses 78D may be provided so as to overlap the scan line drive circuit 15 in one region of the peripheral region GA, and the dummy lenses 78D may be provided so as to overlap the dummy photodiodes 30D in the other region of the peripheral region GA.

While the preferred embodiment of the present disclosure has been described above, the present disclosure is not limited to the embodiment described above. The content disclosed in the embodiment is merely exemplary, and can be variously changed within the scope not departing from the gist of the present disclosure. Any modification appropriately made within the scope not departing from the gist of the present disclosure also naturally belongs to the technical scope of the present disclosure. At least one of various omissions, replacements, and modifications of the components can be made without departing from the gist of the embodiment and the modifications thereof described above.

What is claimed is:

1. A detection device comprising:
a substrate that has a detection region;
a plurality of photodiodes provided in the detection region;
a plurality of lenses provided so as to overlap the respective photodiodes;
a plurality of dummy lenses that are provided in a peripheral region between an outer perimeter of the detection region and edges of the substrate and are provided so as not to overlap the photodiodes;
a plurality of signal lines provided in the detection region; and
a plurality of dummy photodiodes that are provided in the peripheral region and are provided so as not to be coupled to at least the signal lines, wherein
the dummy lenses are provided so as to overlap the respective dummy photodiodes.

2. The detection device according to claim 1, comprising:
a plurality of scan lines provided in the detection region; and
a drive circuit that is provided in the peripheral region and is coupled to the scan lines, wherein
the dummy lenses are provided so as to overlap the drive circuit.

3. The detection device according to claim 1, comprising a filter layer configured to block light in a predetermined wavelength band, wherein
the filter layer is provided over the detection region and a region of the peripheral region that overlaps the dummy lenses.

4. The detection device according to claim 1, wherein
each of the photodiodes includes a plurality of partial photodiodes, and
the lenses are provided so as to overlap the respective partial photodiodes.

5. A detection device comprising:
a substrate that has a detection region;
a plurality of photodiodes provided in the detection region;
a plurality of lenses provided so as to overlap the respective photodiodes;
a plurality of dummy lenses that are provided in a peripheral region between an outer perimeter of the detection region and edges of the substrate and are provided so as not to overlap the photodiodes;
an organic protective film that covers the photodiodes;
a first light-blocking layer that is provided between the organic protective film and the lenses and is provided with first openings in regions overlapping the respective photodiodes;
a second light-blocking layer that is provided between the first light-blocking layer and the lenses and is provided with second openings in regions overlapping the respective photodiodes and the respective first openings;
a first light-transmitting resin layer provided between the first light-blocking layer and the second light-blocking layer; and
a second light-transmitting resin layer provided between the second light-blocking layer and the lenses, wherein
the first light-blocking layer is provided on the organic protective film so as to be directly in contact with the organic protective film.

6. The detection device according to claim 5, wherein
the first light-blocking layer and the second light-blocking layer are provided over the detection region and a region of the peripheral region that overlaps the dummy lenses, and
at least one of the first opening or the second opening is not provided in each of the regions overlapping the dummy lenses.

7. The detection device according to claim 5, comprising:
a plurality of scan lines provided in the detection region; and
a drive circuit that is provided in the peripheral region and is coupled to the scan lines, wherein
the dummy lenses are provided so as to overlap the drive circuit.

8. The detection device according to claim 5, comprising:
a plurality of signal lines provided in the detection region; and
a plurality of dummy photodiodes that are provided in the peripheral region and are provided so as not to be coupled to at least the signal lines, wherein
the dummy lenses are provided so as to overlap the respective dummy photodiodes.

9. The detection device according to claim 8, wherein
the first light-blocking layer and the second light-blocking layer are provided over the detection region and a region of the peripheral region that overlaps the dummy lenses, and
at least one of the first opening or the second opening is not provided in each of the regions overlapping the dummy lenses.

10. The detection device according to claim 5, comprising a filter layer configured to block light in a predetermined wavelength band, wherein
the filter layer is provided over the detection region and a region of the peripheral region that overlaps the dummy lenses.

11. The detection device according to claim 5, wherein
each of the photodiodes includes a plurality of partial photodiodes, and
the lenses are provided so as to overlap the respective partial photodiodes.

12. A detection device comprising:
a substrate that has a detection region;

a plurality of photodiodes provided in the detection region;

a plurality of lenses provided so as to overlap the respective photodiodes; and a plurality of dummy lenses that are provided in a peripheral region between an outer perimeter of the detection region and edges of the substrate and are provided so as not to overlap the photodiodes, wherein at least one of the dummy lenses has a height different from a height of the lenses.

13. The detection device according to claim 12, comprising:

a plurality of scan lines provided in the detection region; and a drive circuit that is provided in the peripheral region and is coupled to the scan lines, wherein the dummy lenses are provided so as to overlap the drive circuit.

14. The detection device according to claim 12, comprising:

a plurality of signal lines provided in the detection region; and a plurality of dummy photodiodes that are provided in the peripheral region and are provided so as not to be coupled to at least the signal lines, wherein the dummy lenses are provided so as to overlap the respective dummy photodiodes.

15. The detection device according to claim 12, comprising:

an organic protective film that covers the photodiodes;

a first light-blocking layer that is provided between the organic protective film and the lenses and is provided with first openings in regions overlapping the respective photodiodes;

a second light-blocking layer that is provided between the first light-blocking layer and the lenses and is provided with second openings in regions overlapping the respective photodiodes and the respective first openings;

a first light-transmitting resin layer provided between the first light-blocking layer and the second light-blocking layer; and a second light-transmitting resin layer provided between the second light-blocking layer and the lenses, wherein the first light-blocking layer is provided on the organic protective film so as to be directly in contact with the organic protective film.

16. The detection device according to claim 15, wherein the first light-blocking layer and the second light-blocking layer are provided over the detection region and a region of the peripheral region that overlaps the dummy lenses, and at least one of the first opening or the second opening is not provided in each of the regions overlapping the dummy lenses.

17. The detection device according to claim 12, comprising a filter layer configured to block light in a predetermined wavelength band, wherein the filter layer is provided over the detection region and a region of the peripheral region that overlaps the dummy lenses.

18. The detection device according to claim 12, wherein each of the photodiodes includes a plurality of partial photodiodes, and the lenses are provided so as to overlap the respective partial photodiodes.

* * * * *